United States Patent
Fahlteich et al.

(10) Patent No.: US 11,518,157 B2
(45) Date of Patent: Dec. 6, 2022

(54) MULTI-LAYER FUNCTIONAL FILM AND PRODUCTION METHOD THEREOF

(71) Applicants: DuPont Teijin Films U.S. Limited Partnership, Wilmington, DE (US); Fraunhofer-Gesellschaft zur Förderung der Angewandten Forschung E.V., Munich (DE)

(72) Inventors: John Fahlteich, Munich (DE); Nicole Prager, Munich (DE); Matthias Fahland, Munich (DE); Olaf Zywitzki, Munich (DE); Valentijn Von Morgen, Redcar Cleveland (GB); Robert Eveson, Redcar Cleveland (GB)

(73) Assignees: DuPont Teijin Films U.S. Limited Partnership, Wilmington, DE (US); Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 70 days.

(21) Appl. No.: 16/624,659

(22) PCT Filed: Jun. 26, 2018

(86) PCT No.: PCT/EP2018/067107
§ 371 (c)(1),
(2) Date: Dec. 19, 2019

(87) PCT Pub. No.: WO2019/002290
PCT Pub. Date: Jan. 3, 2019

(65) Prior Publication Data
US 2020/0147949 A1 May 14, 2020

(30) Foreign Application Priority Data
Jun. 27, 2017 (GB) .................... 1710213

(51) Int. Cl.
*B32B 37/02* (2006.01)
*B32B 7/06* (2019.01)
(Continued)

(52) U.S. Cl.
CPC ............. *B32B 37/02* (2013.01); *B32B 7/06* (2013.01); *B32B 27/32* (2013.01);
(Continued)

(58) Field of Classification Search
CPC ........... B32B 2250/24; B32B 2255/10; B32B 2255/20; B32B 2255/205; B32B 2270/00;
(Continued)

(56) References Cited

U.S. PATENT DOCUMENTS 4,540,623 A 9/1985 Im et al.
6,198,217 B1 3/2001 Suzuki et al.
(Continued)

FOREIGN PATENT DOCUMENTS

EP 0 345 884 A2 12/1989
EP 0 663 867 B1 3/2000
(Continued)

OTHER PUBLICATIONS

International Search Report and Written Opinion for PCT/EP2018/067107 dated Sep. 4, 2018. 10 pages.
(Continued)

*Primary Examiner* — Philip C Tucker
*Assistant Examiner* — Brian R Slawski
(74) *Attorney, Agent, or Firm* — Wolf, Greenfield & Sacks, P.C.

(57) ABSTRACT

A method of preparing a multi-layer assembly, or of protecting a surface of a multi-layer substrate from damage and/or contamination and/or debris, said method comprising the steps of: (i) providing a composite film comprising a polymeric base layer having a first and second surface and (Continued)

Figure 1:
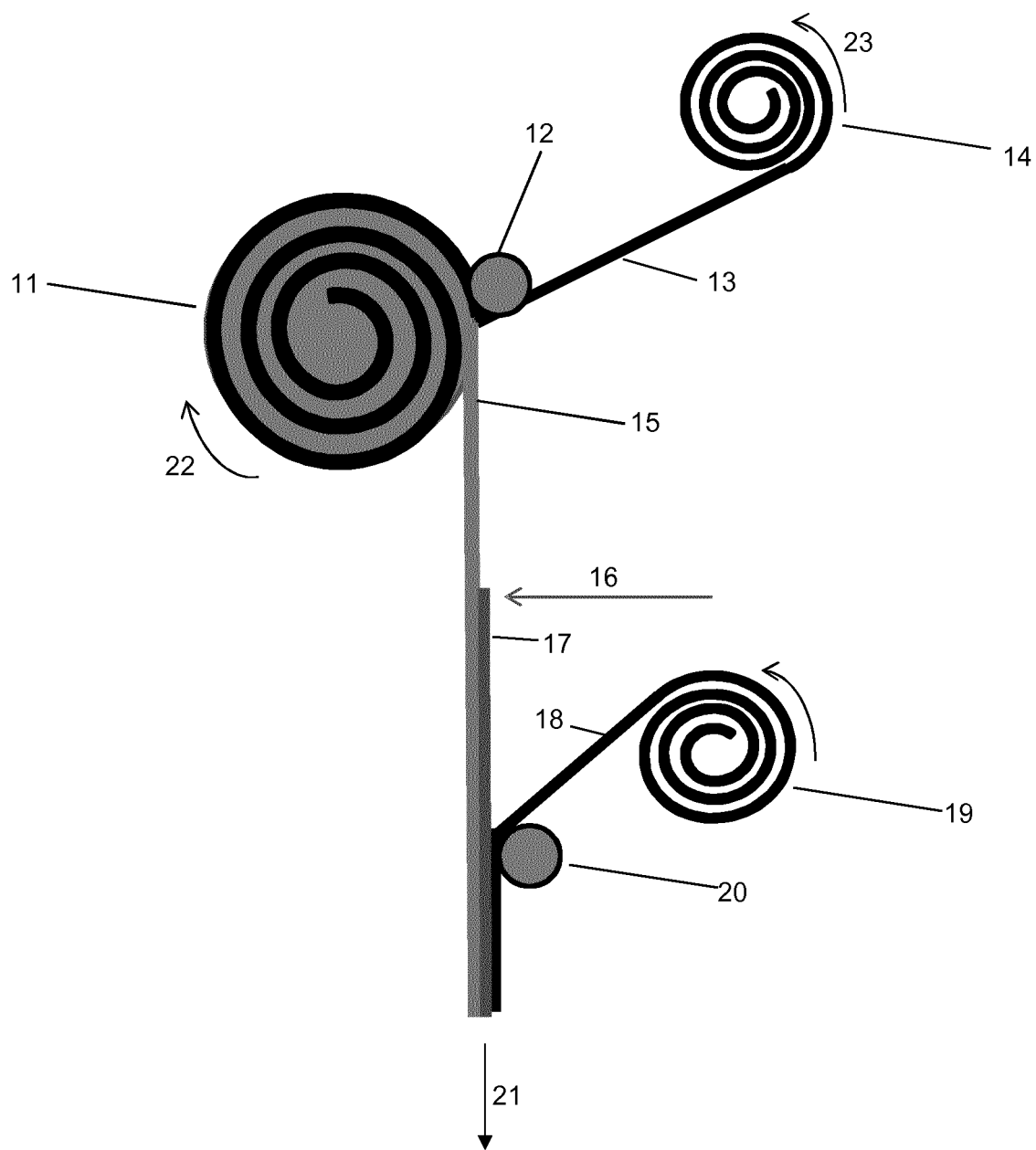

disposed on the first surface thereof a polymeric protective layer having a first surface and a second surface such that the first surface of the said base layer is in contact with the first surface of the polymeric protective layer, wherein said polymeric protective layer comprises an ethylene-based copolymer, and preferably wherein the polymeric base layer comprises a polyester derived from one or more diol(s) and one or more dicarboxylic acid(s); (ii) removing said polymeric protective layer from the first surface of said base layer; (iii) disposing on the exposed first surface of said base layer one or more functional layers to provide a multi-layer substrate, wherein the, or at least the uppermost, functional layer comprises zinc and/or tin in an amount of from about 5 to about 80 wt % of said functional layer; and (iv) disposing a polymeric protective layer comprising an ethylene-based copolymer onto the exposed surface of the, or at least the uppermost, functional layer comprising zinc and/or tin to provide a multi-layer assembly.

57 Claims, 3 Drawing Sheets

(51) Int. Cl.
| | |
|---|---|
| *B32B 27/32* | (2006.01) |
| *B32B 27/30* | (2006.01) |
| *B32B 37/00* | (2006.01) |
| *B32B 7/035* | (2019.01) |
| *B29C 65/00* | (2006.01) |
| *B32B 27/08* | (2006.01) |

(52) U.S. Cl.
CPC ......... *B29C 66/73186* (2013.01); *B32B 7/035* (2019.01); *B32B 27/08* (2013.01); *B32B 27/306* (2013.01); *B32B 27/308* (2013.01); *B32B 2037/0092* (2013.01)

(58) Field of Classification Search
CPC ........ B32B 2307/518; B32B 2307/538; B32B 2307/7244; B32B 2307/7246; B32B 2307/732; B32B 2307/748; B32B 2457/206; B32B 2553/00; B32B 27/08; B32B 27/18; B32B 27/283; B32B 27/306; B32B 27/308; B32B 27/32; B32B 27/36; B32B 3/04; B32B 37/02; B32B 37/025; B32B 7/035; B32B 2037/0092; C09D 133/10; H01L 23/29; B29C 66/73186; B29C 66/73366
USPC ......... 156/60, 152, 184, 185, 187, 191, 192, 156/247, 278, 324, 701, 714, 715; 427/96.1, 96.8, 97.1, 108, 109, 126.1, 427/126.3, 248.1, 255.11, 255.19, 255.5, 427/294, 296; 428/221, 332, 336, 337, 428/339, 411.1, 500, 523, 688, 689, 697, 428/702
See application file for complete search history.

(56) References Cited

U.S. PATENT DOCUMENTS

| | | |
|---|---|---|
| 6,744,425 B2 | 6/2004 | Yoshikawa et al. |
| 7,396,632 B2 | 7/2008 | Wolk et al. |
| 2008/0020210 A1 | 1/2008 | Griffin et al. |
| 2010/0136331 A1 | 6/2010 | Fahland et al. |
| 2012/0168301 A1 | 7/2012 | Fahland et al. |
| 2015/0240086 A1 | 8/2015 | Iwata et al. |

FOREIGN PATENT DOCUMENTS

| | | |
|---|---|---|
| EP | 2 228 463 A1 | 9/2010 |
| EP | 2 312 015 A2 | 4/2011 |
| JP | 2000-307137 A | 11/2000 |
| JP | 2001-326371 A | 11/2001 |
| WO | WO 2009/105427 A2 | 8/2009 |
| WO | WO 2011/030098 A | 3/2011 |
| WO | WO 2012/123699 A1 | 9/2012 |
| WO | WO 2016/167348 A1 | 10/2016 |

OTHER PUBLICATIONS

Huang, Packaging Paper Processing and Testing Technology. Printing Industry Press. Jan. 31, 2009;1:2 pages.
Li, Functional and Intelligent Polymer Materials. National Defense Industry Press. Oct. 31, 2006;1:4 pages.

MULTI-LAYER FUNCTIONAL FILM AND PRODUCTION METHOD THEREOF

RELATED APPLICATIONS

This application is a national stage filing under 35 U.S.C. § 371 of international application number PCT/EP2018/067107, filed Jun. 26, 2018, which claims the benefit of United Kingdom application number GB 1710213.8, filed Jun. 27, 2017, each of which is herein incorporated by reference in its entirety.

The present invention relates to a functional multi-layer film and a process for its production. The invention particularly relates to permeation barrier films and encapsulation films, particularly those suitable as packaging or as a substrate or element in an electronic device.

Polymeric films are widely used as packaging material or as a protective film for sensitive materials, because they can provide mechanical protection as well as a permeation barrier layer for gases, particularly oxygen and/or water vapour which can cause undesirable chemical change in the underlying sensitive material. The use of barrier films is widespread in the packaging of foodstuffs. However, a standard polyethylene terephthalate (PET) film having a thickness of 125 µm provides a water vapour transmission rate (WVTR) of about 4.5 g/m$^2$/day (at 38° C. and 90% relative humidity), and there are many applications, such as in the packaging of certain foods and in electronic devices, where a much greater permeation barrier is required. For instance, food packaging may be required to exhibit a WVTR of no more than 1 g/m$^2$/day; permeation barrier films for solar cells should normally exhibit a WVTR of no more than 10$^{-3}$ g/m$^2$/day; thin-film lithium batteries should normally exhibit a WVTR of no more than about 2×10$^{-4}$ g/m$^2$/day; and organic light-emitting diodes should normally require a WVTR of no more than about 10$^{-6}$ g/m$^2$/day. Accordingly, various multi-layer barrier films have been developed typically comprising a relatively thick polymeric base layer and a relatively thin functional layer, referred to as a barrier layer. A wide variety of organic and inorganic barrier layers have been proposed, including aluminium, aluminium oxide and silicon nitride ($Si_3N_4$). Often multiple barrier layers, or a combination of inorganic and organic barrier layers, may be needed to provide the requisite permeation barrier, which can undesirably increase the cost of materials and manufacture.

A barrier film may also be required to be transparent in the visible spectrum, for instance when the barrier film is used for the encapsulation of sensitive materials in opto-electronic devices, such as solar cells or display devices.

A barrier film comprising a polymeric base layer is often required to be flexible, and hence the barrier layer must also be able to flex without cracking in order to retain the permeation barrier.

In addition, the barrier layer or other functional layer(s) in the film should adhere well to the other layers in the film and the multi-layer film structure should exhibit good delamination resistance.

Particularly in the manufacture of electronic devices, it is sometimes necessary to provide a very smooth and flat surface for the further processing of a base layer, for instance to ensure the integrity of a subsequently applied barrier layer or other functional coating, such as a conductive coating, in order to avoid breaks or pin-pricks therein. The manufacture of an electronic device, for instance, may involve the sputtering of a conductive layer on a film substrate, and non-uniformity in the substrate surface can cause non-uniformity and/or discontinuities in the conductive layer, resulting in non-uniform conductivity or pixel yield problems. One method of achieving a very smooth and flat surface is disclosed in WO-2012/123699-A, which teaches a coextruded film comprising a substrate layer and a strippable sacrificial protective layer which is easily peelable from the substrate, in order to protect the surface thereof from extrinsic defects such as damage, contamination and/or debris during storage or transport. The sacrificial layer is stripped from the substrate during manufacture of the electronic device to leave a clean surface immediately prior to the application of the functional layer on the surface of the substrate. In the invention of WO-2012/123699-A, not only does the coextruded sacrificial layer protect the substrate surface from extrinsic defects, but it also reduces the intrinsic defects of the substrate thereby providing a further improvement in surface smoothness. Other disclosures of strippable sacrificial layers in multilayer polymeric films include WO-2009/105427-A, EP-0345884-A, EP-0663867-A, U.S. Pat. Nos. 4,540,623 and 7,396,632. The manufacture of multi-layer coated films of this type is typically achieved using a roll-to-roll coating method comprising a plurality of rollers. Thus, a multi-layer film comprising the sacrificial layer and the substrate to be coated is unwound from a first film roll and the sacrificial layer stripped from the substrate. The exposed surface of the substrate is then treated by disposing thereon a functional layer, normally in a clean environment, and typically using an apparatus comprising multiple rollers to convey the film through the apparatus, and the resultant film is then re-wound into a second film roll. Such a process is disclosed, for instance, in EP-2312015-A and EP-2228463-A, but does not, however retain the surface of the functional layer free from defects and damage induced by the winding and handling of the film in the apparatus. It would be desirable to protect the functional layer during downstream processing, including during deposition of the or each subsequently applied layer (for instance a conductive layer), and indeed throughout the manufacturing process (particularly a roll-to-roll manufacturing process).

It is an object of the invention to address one or more of the afore-mentioned problems. It is a particular object of this invention to provide an improved and more efficient and economic method of manufacture of a multi-layer structure which allows the provision of a substrate having low surface defects and high cleanliness such that it is suitable for the deposition of a uniform functional layer, and particularly wherein the delamination resistance of the multi-layer substrate is increased, and/or particularly wherein the surface of the functional layer is retained free from defects and damage induced by downstream processing, such as by the winding and handling of the film in the apparatus or by the deposition of subsequently applied further functional layers, particularly conductive layers. It is also an object of this invention to provide a process which avoids the deposition of a planarising layer, for instance an organic planarising layer, prior to application of a functional layer requiring high surface smoothness.

It is a particular object of this invention to provide a multi-layer structure providing excellent or superior barrier performance, and particularly one which allows the deposition of subsequently applied functional layers without detriment to the barrier performance. The multi-layer structure is particularly suitable for use as a layer in an electronic device.

A further object of the present invention is to provide a multi-layer structure which allows a more efficient and economic method of manufacture of an electronic device requiring encapsulation to protect against water ingress, and in particular which allows a more efficient and economic method of encapsulation.

According to a first aspect of the present invention, there is provided a method of preparing a multi-layer assembly, or of protecting a surface of a multi-layer substrate from damage and/or contamination and/or debris, said method comprising the steps of:

(i) providing a composite film comprising a polymeric base layer having a first and second surface and disposed on the first surface thereof a polymeric protective layer having a first surface and a second surface such that the first surface of the said base layer is in contact with the first surface of the polymeric protective layer, wherein said polymeric protective layer comprises an ethylene-based copolymer;

(ii) removing said polymeric protective layer from the first surface of said base layer;

(iii) disposing on the exposed first surface of said base layer one or more functional layers to provide a multi-layer substrate, preferably wherein the, or at least the uppermost, functional layer comprises zinc and/or tin in an amount of from about 5 to about 80 wt % of said functional layer; and (iv) disposing a polymeric protective layer comprising an ethylene-based copolymer onto the exposed surface of the, or at least the uppermost, functional layer comprising zinc and/or tin to provide a multi-layer assembly.

It will be appreciated by the skilled person that steps (i) to (iv) are conducted in the order (i), (ii), (iii) and (iv).

The present inventors found that, unexpectedly, application or re-application of said ethylene-based copolymeric protective layer to the functionalised substrate resulted in a strong adhesive bond to the functionalised surface. Said protective layer advantageously protected the functional layer during downstream processing, and facilitates the reliable manufacture of a multilayer assembly having improved barrier performance. The protective layer of the multilayer assembly also unexpectedly facilitates the encapsulation of an electronic device with an encapsulating layer by acting as an adhesive for the encapsulating layer, allowing the additional adhesive used in con conventional processes to be dispensed with.

The Polymeric Base Layer

The polymeric base layer is a self-supporting film or sheet, by which is meant a film or sheet capable of independent existence in the absence of a supporting base. In the present invention, both the polymeric base layer and the polymeric protective layer are self-supporting.

The polymeric base layer preferably comprises a polyester, preferably a linear polyester. Preferably, the polyester is a thermoplastic polyester. Preferably, the polyester is a crystallisable polyester. The term "polyester" as used herein includes a polyester homopolymer in its simplest form or modified, chemically and/or physically. The term "polyester" further includes copolyesters. A copolyester may be a random, alternating or block copolyester.

The polyester is preferably derived from one or more diol(s) and one or more dicarboxylic acid(s). Preferably, the polyester is derived from: (i) one or more diol(s); (ii) one or more aromatic dicarboxylic acid(s); and (iii) optionally, one or more aliphatic dicarboxylic acid(s) of formula $CnH_{2n}(COOH)_2$ wherein n is 2 to 8, wherein said aromatic dicarboxylic acid(s) is/are present in the polyester in an amount of from about 80 to about 100 mole % based on the total amount of dicarboxylic acid components in the polyester. Preferably, the dicarboxylic acid(s) which make up said polyester are aromatic dicarboxylic acid(s). In a preferred embodiment, the polyester comprises only one diol and only one dicarboxylic acid, which is preferably an aromatic dicarboxylic acid.

Suitable aromatic dicarboxylic acids are preferably selected from terephthalic acid, isophthalic acid, phthalic acid, 1,4-, 2,5-, 2,6- or 2,7-naphthalenedicarboxylic acid, and is preferably terephthalic acid or 2,6-naphthalenedicarboxylic acid. The diol is preferably selected from aliphatic and cycloaliphatic glycols, e.g. ethylene glycol, 1,3-propanediol, 1,4-butanediol, neopentyl glycol and 1,4-cyclohexanedimethanol, preferably from aliphatic glycols. Preferably the polyester contains only one glycol, preferably ethylene glycol. Suitable aliphatic dicarboxylic acids include succinic acid, glutaric acid, adipic acid, pimelic acid, suberic acid, azeleic acid or sebacic acid. Preferred homopolyesters are polyesters of 2,6-naphthalenedicarboxylic acid or terephthalic acid with ethylene glycol.

The polyester is the major component of the polymeric base layer, and makes up at least 50%, preferably at least 65%, preferably at least 80%, preferably at least 90%, and preferably at least 95% by weight of the total weight of said base layer.

The intrinsic viscosity (IV) of the polyester from which the base layer is manufactured is typically at least about 0.58, more typically at least about 0.60, and typically no more than about 0.70. In a preferred embodiment, a PET polyester has an IV in the range of from about 0.6 to about 0.65, and a PEN polyester has an IV in the range of from about 0.58 to about 0.68. In an alternative embodiment, the base layer can be manufactured from a polyester with a higher intrinsic viscosity, for instance, having an IV of at least about 0.70, and in a further embodiment at least about 0.80, and typically no more than 0.90.

The polyester is obtainable from said dicarboxylic acid(s) or their lower alkyl (up to 6 carbon atoms) diesters with one or more diols. Formation of the polyester is conveniently effected in a known manner by condensation or ester interchange, generally at temperatures up to about 295° C. In one embodiment, solid state polymerisation may be used to increase the intrinsic viscosity to the desired value, using conventional techniques well-known in the art, for instance using a fluidised bed such as a nitrogen fluidised bed or a vacuum fluidised bed using a rotary vacuum drier.

The polymeric base layer may comprise any other additive conventionally employed in the manufacture of polymer films. Thus, agents such as cross-linking agents, dyes, fillers, pigments, voiding agents, lubricants, radical scavengers, thermal stabilisers, anti-oxidants, UV-stabilisers, hydrolysis stabilisers, flame retardants and inhibitors, anti-blocking agents, surface active agents, slip aids, gloss improvers, prodegradents, viscosity modifiers and dispersion stabilisers may be incorporated as appropriate. Such components may be introduced into the polymer in a conventional manner. For example, by mixing with the monomeric reactants from which the film-forming polymer is derived, or the components may be mixed with the polymer by tumble or dry blending or by compounding in an extruder, followed by cooling and, usually, comminution into granules or chips. Masterbatching technology may also be employed.

In particular, the polymeric base layer may comprise one or more UV-stabiliser(s), particularly when the multi-layer substrate is intended for use in exterior applications, for instance photovoltaic cells. Typically, the UV-stabiliser is an organic UV-stabiliser, for instance the organic UV-stabilisers disclosed in WO-2012/123699-A the disclosure of which is incorporated herein by reference. A preferred class of UV-stabiliser is the hydroxyphenyltriazines, and particularly hydroxyphenyltriazine compounds of formula (II):

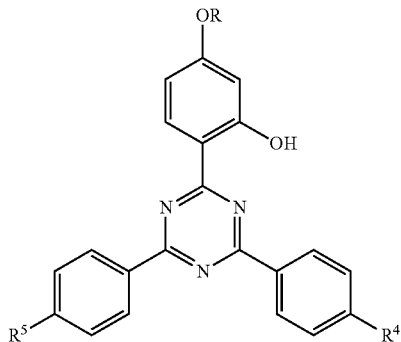

wherein, in the context of formula (II), R is hydrogen, $C_1$-$C_{18}$ alkyl, $C_2$-$C_6$ alkyl substituted by halogen or by $C_1$-$C_{12}$ alkoxy, or is benzyl and $R^4$ and $R^5$ are independently selected from hydrogen, alkyl, alkoxy or phenyl. R is preferably $C_1$-$C_{12}$ alkyl or benzyl, more preferably $C_3$-$C_6$ alkyl, and particularly hexyl. $R^4$ and $R^5$ are preferably hydrogen. An especially preferred UV-stabiliser is 2-(4,6-diphenyl-1,3,5-triazin-2-yl)-5-(hexyl)oxy-phenol, which is commercially available as Tinuvin™ 1577 from BASF, and which is a compound of formula (II) above, wherein R is $C_6H_{13}$ and $R^4$ and $R^5$ are both H. A further especially preferred UV-stabiliser is a 2-(2'-hydroxyphenyl)-4,6-diphenyl triazine which is commercially available as Tinuvin™ 1600 from BASF, and which is a triazine of formula (II) above, wherein R is $CH_2CH(C_2H_5)C_4H_9$, $R^4$ is phenyl and $R^5$ is hydrogen.

The amount of UV-stabiliser is preferably in the range from 0.1% to 10%, more preferably 0.2% to 7%, more preferably 0.6% to 4%, particularly 0.8% to 2%, and especially 0.9% to 1.2% by weight, relative to the total weight of the polymeric base layer.

The presence of one or more anti-oxidant(s) in the polymeric base layer may also be particularly advantageous. Suitable antioxidants include hindered phenols, secondary aromatic amines and hindered amines, such as Tinuvin™ 770 (Ciba-Geigy), as disclosed in WO-2012/123699-A the disclosure of which is incorporated herein by reference. The concentration of antioxidant present in the base layer is preferably in the range from 50 ppm to 5000 ppm of the polymer of the base layer, more preferably in the range from 300 ppm to 1500 ppm, particularly in the range from 400 ppm to 1200 ppm, and especially in the range from 450 ppm to 600 ppm.

The polymeric base layer preferably comprises one or more hydrolysis stabiliser(s). Any hydrolysis stabiliser conventional in the art may be used. A preferred hydrolysis stabiliser, particularly for a polyester base layer, is a glycidyl ester of a branched monocarboxylic acid, wherein the monocarboxylic acid has from 5 to 50 carbon atoms, and wherein said glycidyl ester is present in the form of its reaction product with at least some of the end groups of the polymer. Such compounds are disclosed in WO-2011/030098-A, the disclosure of which is incorporated herein by reference. The total amount of hydrolysis stabiliser present in the polymeric base layer is preferably in the range of from about 0.10 to about 5.0 mol %, more preferably from about 0.20 to about 2.5 mol %, more preferably from about 0.25 to about 1.5 mol %, more preferably from about 0.35 to about 1.0 mol %, based on the amount of the polymer of the polymeric base layer. Preferred glycidyl esters are those having the formula (I):

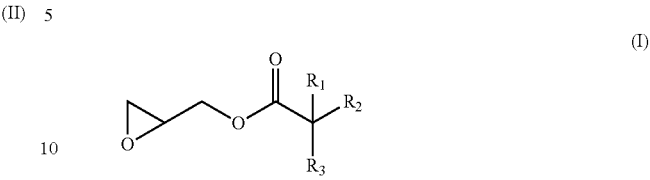

wherein, in the context of formula (I):
$R^1$ and $R^2$ are independently selected from alkyl,
$R^3$ is selected from hydrogen and alkyl, and preferably from alkyl; and
wherein the total number of carbon atoms in the groups $R^1$, $R^2$ and $R^3$ is from 3 to 48, preferably from 3 to 23, preferably from 3 to 13, preferably from 6 to 10, preferably from 7 to 9, and preferably 8.

In the context of formula (I), preferably at least one of $R^1$ and $R^2$ is methyl. More preferably, $R^1$ is methyl and $R^2$ is an alkyl group comprising at least 2 carbon atoms.

Where a mixture of glycidyl esters is used in a given layer of the film, each of the glycidyl esters is independently selected according to formula (I), and preferably such that the total number of carbon atoms in the alkyl groups $R^1$, $R^2$ and $R^3$ in each glycidyl ester of the mixture is the same.

In the context of formula (I), preferably $R^1$ is methyl, and $R^2$ and $R^3$ are independently selected from alkyl groups such that the total number of carbon atoms in $R^2$ and $R^3$ is from 2 to 47, preferably from 2 to 22, preferably from 2 to 12, preferably from 5 to 9, preferably from 6 to 8, and in one embodiment the total number of carbon atoms in $R^2$ and $R^3$ is 7. In further embodiments, a mixture of these preferred glycidyl esters is used, preferably such that the total number of carbon atoms in the alkyl groups $R^1$, $R^2$ and $R^3$ in each component of the mixture is the same.

As used herein, the term "alkyl" preferably refers to an unsubstituted straight-chain acyclic hydrocarbon group of formula $[-C_nH_{2n+1}]$.

Preferably, the polymeric base layer comprises a particulate filler, which can improve handling and windability during manufacture and/or modulate optical properties. The particulate filler is typically a particulate inorganic filler (e.g. metal or metalloid oxides, such as alumina, titania, talc and silica (especially precipitated or diatomaceous silica and silica gels), calcined china clay and alkaline metal salts, such as the carbonates and sulphates of calcium and barium). A particulate inorganic filler is preferably finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 μm, more preferably 0.05 to 1.5 μm, and particularly 0.15 to 1.2 μm. Preferably at least 90%, more preferably at least 95% by volume of the inorganic filler particles are within the range of the volume distributed median particle diameter ±0.8 μm, and particularly ±0.5 μm. Particle size of the filler particles may be measured by electron microscope, coulter counter, sedimentation analysis and static or dynamic light scattering. Techniques based on laser light diffraction are preferred.

Typically, the polymeric base layer is optically clear, since the majority of the intended end-uses of the multi-layer substrate described herein demand transparency and good aesthetic appearance. As used herein, the term "optically clear" preferably means a % of scattered visible light (haze) of no more than 15%, preferably no more than 10%, preferably no more than 6%, more preferably no more than 3.5%, more preferably no more than 1.5%, and particularly no more than 1.0%, and/or a total luminous transmission (TLT) for light in the visible region (400 nm to 700 nm) of at least 75%, preferably at least 80%, preferably at least 85%, more preferably at least about 90%. In this embodiment, any filler in the polymeric base layer is typically present in only small amounts, generally not exceeding 0.5% and preferably less than 0.2% by weight of a layer, and the filler is preferably silica. In this embodiment, the windability of the film (i.e. the absence of blocking or sticking when the film is wound up into a roll) is improved, without an unacceptable reduction in haze or other optical properties.

In an alternative embodiment, the polymeric base layer is opaque. An opaque film preferably exhibits a Transmission Optical Density (TOD) of at least 0.4, preferably at least 0.5, preferably at least 0.6, preferably at least 0.7, preferably at least 1.0 and preferably at least 1.5, and in one embodiment preferably at least 2.0, preferably at least 3.0, and preferably at least 4.0. An opaque polymeric base layer may be pigmented as required, and in one embodiment, the base layer is white, grey or black. Suitable whitening agents include the particulate inorganic fillers referred to hereinabove, particularly barium sulphate and titanium dioxide, and particularly titanium dioxide. Suitable opacifying agents include carbon black, or a metallic filler such as aluminium powder, as is known in the art.

The intrinsic viscosity of a polyester base layer is typically lower than that of the polyester from which it is manufactured. In one embodiment, the IV of the polyester base layer is at least about 0.52, preferably at least about 0.60 and typically no more than about 0.70. Typically, a PET base layer has an IV in the range of from about 0.57 to about 0.65, and preferably at least about 0.60. A PEN base layer has an IV in the range of from about 0.52 to about 0.68, and preferably at least about 0.60. In an alternative embodiment, a polyester base layer has a higher intrinsic viscosity, for instance, having an IV of at least about 0.70, preferably at least about 0.75, and typically no more than about 0.80.

The polymeric base layer preferably exhibits a low shrinkage, preferably no more than 1.5% at 150° C. over 30 minutes, and preferably no more than 1.0%, particularly in the machine (longitudinal dimension) of the film, and preferably in both dimensions of the film (i.e. the longitudinal and transverse dimensions). The polymeric base layer should not undergo unacceptable dimensional distortion, such as curl, when subjected to subsequent processing conditions, for instance processing involving elevated temperature (such as sputtering to deposit a functional layer), which may be used for instance in the manufacture of electronic display devices.

The Polymeric Protective Layer

The polymeric protective layer comprises (and suitably consists, or consists essentially, of) an ethylene-based copolymer.

Preferably, the ethylene-based copolymer is an ethylene-methacrylic acid (EMAA) copolymer or an ethylene-acrylic acid (EAA) copolymer, or a blend thereof. The copolymers are preferably branched and preferably random.

In one preferred embodiment, the methacrylic acid is present in the copolymer in the range of from about 2 to about 15 wt % of the copolymer, more preferably in the range of from about 2 to about 10 wt %, and preferably in the range of from about 7 to about 10 wt %. In an alternative embodiment, the methacrylic acid is present in the copolymer in the range of from about 2 to less than about 7 wt %. Suitable EMAA copolymers include Nucrel® resins (DuPont), particularly Nucrel® grades 0411HS and 0908HS.

In a further preferred embodiment, the ethylene-based copolymer is selected from ethylene-acrylic acid (EAA) copolymers, preferably wherein the acrylic acid is present in the EAA copolymer in the range of from about 5 to about 20 wt %, preferably from about 7 to about 18 wt %, of the copolymer.

Optionally, the ethylene-based copolymer has been partially or completely reacted with metallic salts, enabling the formation of ionic cross-links between the acid groups within a chain, or between neighbouring chains. Such copolymers are known as ionomers, defined herein as a polymer made up primarily of non-polar repeat units with a minor proportion (typically no more than about 15 wt %) of metal salt-containing units of the acid (i.e. the methacrylic or acrylic acid, preferably methacrylic acid). Preferred ionomers are the copolymers of ethylene and the acid (preferably methacrylic acid) partially or completely neutralised with alkali metals or zinc. Suitable commercially available compounds include Surlyn® resins (DuPont), particularly grades 1605 and 1652. The metal cation is typically selected from alkali metals such as lithium and sodium. Zinc or magnesium may also be used. Typically, the metal cation is present at no more than about 15 mol %. Preferably, however, the ethylene-based copolymer is not an ionomer and does not contain metal ions.

In a preferred embodiment, the melting temperature of the ethylene-based copolymer is at least about 90° C., and preferably no more than about 250° C., preferably no more than about 200° C., preferably no more than about 150° C., more preferably no more than about 120° C. In a further preferred embodiment, the VICAT softening point of the ethylene-based copolymer is at least about 60° C., and typically in the range from about 60° C. to about 110° C., more typically in the range from about 70° C. to about 100° C. Advantageously, the polymeric protective layer comprising said ethylene-based polymer is thus heat-sealable to an encapsulant layer without the need for an additional or intervening layer of adhesive, and at temperatures which do not damage the encapsulated layers or device.

Optionally, the polymeric protective layer may further comprise one or more polyolefin(s), preferably polypropylene and/or polyethylene, and preferably polyethylene, and preferably low density polyethylene (LDPE; characterised by a density in the range of from 0.910 to 0.940 g/cm$^3$). In such embodiments, the polymeric protective layer comprises (and suitably consists, or consists essentially, of) a blend of said ethylene-based copolymer(s) and said polyolefin. Suitable LDPE polymers are well-known and conventional in the art. In such embodiments, said blend suitably comprises a relatively major proportion of ethylene-based copolymer and a relatively minor proportion of polyolefin, preferably wherein the blend comprises at least 60 wt %, preferably at least 70 wt %, preferably at least 80 wt % of said ethylene-based copolymer, by total weight of the blend.

The Composite Film and Manufacture Thereof

The composite film comprising the polymeric base layer and the polymeric protective layer is preferably a biaxially oriented composite film.

The protective polymeric layer may be disposed on the polymeric base layer by any suitable technique, including coextrusion and lamination, and preferably by coextrusion.

Thus, the composite film is preferably a coextruded composite film, preferably a coextruded biaxially oriented composite film.

Formation of the composite film is effected by conventional extrusion techniques well-known in the art. In general terms the process comprises the steps of extruding layers of molten polymer at a temperature within the range of from about 280 to about 300° C., quenching the extrudate and orienting the quenched extrudate. Orientation may be effected by any process known in the art for producing an oriented film, for example a tubular or flat film process. Preferably, biaxial orientation is effected by drawing in two mutually perpendicular directions in the plane of the film to achieve a satisfactory combination of mechanical and physical properties. In a tubular process, simultaneous biaxial orientation may be effected by extruding a thermoplastics polymer tube which is subsequently quenched, reheated and then expanded by internal gas pressure to induce transverse orientation, and withdrawn at a rate which will induce longitudinal orientation. In the preferred flat film process, the film-forming polymer is extruded through a slot die and rapidly quenched upon a chilled casting drum to ensure that the base layer polymer is quenched to the amorphous state. Orientation is then effected by stretching the quenched extrudate in at least one direction at a temperature above the glass transition temperature of the base layer polymer. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is generally effected so that the dimension of the oriented film is from 2 to 5, more preferably 2.5 to 4.5 times its original dimension in the or each direction of stretching. Typically, stretching is effected at temperatures higher than the $T_g$ of the polyester, preferably about 15° C. higher than the $T_g$. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional support at a temperature above the glass transition temperature of the base layer polymer but below the melting temperature thereof, to induce the desired crystallisation of the polymer. During the heat-setting, a small amount of dimensional relaxation may be performed in the transverse direction (TD) by a procedure known as "toe-in". Toe-in can involve dimensional relaxation of up to about 4%, typically 2 to 4%. An analogous dimensional relaxation in the process or machine direction (MD) is also possible but generally harder to achieve since low line tensions are required and film control and winding becomes problematic. The actual heat-set temperature and time will vary depending on the composition of the film and its desired final thermal shrinkage but should not be selected so as to substantially degrade the toughness properties of the film such as tear resistance. Within these constraints, a heat set temperature of about 180 to 245° C. is generally desirable. After heat-setting the film is typically quenched rapidly in order induce the desired crystallinity of the base layer polymer.

The film may be further stabilized through use of an on-line relaxation stage. Alternatively the relaxation treatment can be performed off-line. In this additional step, the film is heated at a temperature lower than that of the heat-setting stage, and with a much reduced MD and TD tension. The tension experienced by the film is a low tension and typically less than 5 kg/m, preferably less than 3.5 kg/m, more preferably in the range of from 1 to about 2.5 kg/m, and typically in the range of 1.5 to 2 kg/m of film width. For a relaxation process which controls the film speed, the reduction in film speed (and therefore the strain relaxation) is typically in the range 0 to 2.5%, preferably 0.5 to 2.0%. There is no increase in the transverse dimension of the film during the heat-stabilisation step. The temperature to be used for the heat stabilisation step can vary depending on the desired combination of properties from the final film, with a higher temperature giving better, i.e. lower, residual shrinkage properties. A temperature of 135 to 250° C. is generally desirable, preferably 150 to 230° C., more preferably 170 to 200° C. The duration of heating will depend on the temperature used but is typically in the range of 10 to 40 seconds, with a duration of 20 to 30 seconds being preferred. This heat stabilisation process can be carried out by a variety of methods, including flat and vertical configurations and either "off-line" as a separate process step or "in-line" as a continuation of the film manufacturing process. Film thus processed will exhibit a smaller thermal shrinkage than that produced in the absence of such post heat-setting relaxation.

Co-extrusion may be conducted either by simultaneous coextrusion of the respective film-forming layers through independent orifices of a multi-orifice die, and thereafter uniting the still molten layers or, preferably, by single-channel coextrusion in which molten streams of the respective polymers are first united within a channel leading to a die manifold, and thereafter extruded together from the die orifice under conditions of streamline flow without intermixing thereby to produce the composite film, which is oriented and heat-set as hereinbefore described. It will therefore be appreciated by those skilled in the art that the polymer protective layer is disposed directly on one or both surface(s) of said polymeric base layer, i.e. without any intermediate layer.

The thickness of the composite film is preferably in the range of from about 5 to about 750 μm, and more preferably no more than about 500 μm, and typically between about 12 μm and 250 μm. The thickness of the polymeric base layer is preferably in the range of from about 5 to about 500 μm, and typically between about 12 μm and 300 μm. The thickness of the polymeric protective layer is preferably in the range of from about 2 to about 200 μm, and typically no more than about 100 μm, and typically between about 5 μm and 50 μm, and in a preferred embodiment between about 5 and 25 μm. It is preferred that the polymeric base layer makes up greater than 50%, preferably at least 60%, preferably at least 70%, and preferably at least 80% of the total thickness of the composite film, but typically no more than about 95% of the total thickness. In one embodiment, the polymeric base layer makes up from about 75 to about 95% of the total thickness of the composite film. The polymeric protective layer should have a sufficient thickness and mechanical strength to allow an easy and clean peel.

The adhesive bond strength of the polymeric protective layer to said base layer is such that the peel force is no more than about 2.5 N/cm, preferably less than about 2 N/cm, preferably less than 1.5 N/cm, preferably no more than about 1 N/cm, and preferably in the range of from about 0.1 N/cm to about 1 N/cm, measured as described herein.

In the present invention, the intrinsic surface roughness of the first surface of the polymeric base layer, particularly after removal of the polymeric base layer, is primarily analysed by two methods.

The first method analyses the intrinsic "micro-roughness", i.e. the background surface roughness between major surface defects, measured as described herein and preferably characterised by the conventional parameters of Ra and/or Rq. Preferably, the first surface of said polymeric base layer exhibits an Ra value of less than 10 nm, preferably less than 7 nm, preferably less than 5 nm, preferably less than 2 nm, and preferably less than 1 nm, particularly after removal of the polymeric base layer.

The second method analyses the intrinsic "macro-roughness" using large-area metrology (LAM) which analyses the major intrinsic surface defects. The major intrinsic surface defects in the polymeric base layer can be categorised as defects (1) to (3), as defined in WO-2012/123699-A and noted below:

(1) Defects caused by inclusions within the polymeric base layer, which can be caused by the presence of, for instance, fillers, crystallites, degradants and gels (typically regions of intractable polymer (for instance, cross-linked, branched or degraded polymer) having a molecular weight or rheology different to the bulk polymer matrix), and which can be categorised as "pinch-point" defects and "smooth circular" defects:
  (a) Pinch-point defects are characterised by a crater either side of a central peak. It is believed that such defects are caused by inclusions which reside relatively near the surface of the polymeric base layer, which generate greater localised stress/strain regions during the stretching steps of film manufacture.
  (b) Smooth circular defects are characterised by a central peak with no crater. It is believed that such defects are caused by inclusions which reside relatively deeper within the polymeric base layer.
(2) Depressions are characterised by a central crater, sometimes associated with raised areas around the crater. The inventors believe such defects are caused primarily by imperfections (such as gels or gel-like features) in the polymeric protective layer.
(3) Gel-like features or streaks are characterised by globular surface features or elongated regions of raised ridges sometimes associated with shallow valleys either side of the ridge. The inventors believe such defects result from extrusion events, such as die-lip edge flow disturbances and extruded degraded polymer.

Upon removal of the polymeric protective layer, the polymeric base layer preferably exhibits one or more of the following intrinsic surface roughness properties, particularly wherein intrinsic surface roughness is evaluated in respect of the major intrinsic surface defects defined above as (1a), (1b), (2) and (3), and wherein the values of peak height are expressed as the Rp parameter defined herein and the values of crater depth are expressed as the Rv parameter defined herein and measured by phase shift interferometry (PSI) or vertical scanning interferometry (VSI) in the LAM technique as described hereinbelow:

(i) The number (NDT) of all defects with a vertical amplitude, orthogonal to the film plane (i.e. peaks and troughs), of greater than about 0.25 µm and less than about 30 µm above and/or below the mean surface (as defined herein) is no more than 1000, preferably no more than 750, preferably no more than 500, preferably no more than about 400, preferably no more than about 300, preferably no more than 200, preferably no more than 100, preferably no more than 75, preferably no more than 50, and preferably no more than 25, per 31×33 cm area of film surface.

(ii) The number ($N_{PP}$) of pinch-point peaks (1a) with a peak height of greater than about 0.25 µm and less than about 30 µm is no more than 100, preferably no more than 80, preferably no more than 70, preferably no more than 60, preferably no more than 50, preferably no more than 40, preferably no more than 30, and preferably no more than 20, per 31×33 cm area of film surface.

(iii) The number ($N_{GS}$) of gel-like features or streaks (3) with a peak height of greater than about 0.25 µm and less than about 30 µm is no more than 10, preferably no more than 5, preferably no more than 2, and preferably zero, per 31×33 cm area of film surface.

(iv) The improvement ($\Delta$-$N_{DT}$) in the parameter ($N_{DT}$), relative to a control polymeric base layer manufactured without the polymeric protective layer, wherein $\Delta$-$N_{DT}$ is defined as

[$N_{DT}$ of control base layer]/[$N_{DT}$ of stripped inventive base layer]

is preferably at least 2, preferably at least 4, preferably at least 6, preferably at least 7, preferably at least 10.

(v) The improvement ($\Delta$-$N_{PP}$) in the parameter ($N_{PP}$), relative to a control polymeric base layer manufactured without the polymeric protective layer, wherein $\Delta$-$N_{PP}$ is defined as:

[$N_{PP}$ of control base layer]/[$N_{PP}$ of stripped inventive base layer]

is at least 2, preferably at least 4, preferably at least 6, preferably at least 7, preferably at least 10.

(vi) The improvement ($\Delta$-$N_{GS}$) in the parameter ($N_{GS}$), relative to a control polymeric base layer manufactured without the polymeric protective layer, wherein $\Delta$-$N_{GS}$ is defined as:

[$N_{GS}$ of control base layer]/[$N_{GS}$ of stripped inventive base layer]

is at least 2, preferably at least 4, preferably at least 6, preferably at least 7, preferably at least 10.

If desired, the techniques described herein to measure the intrinsic macro-roughness can also be used to measure the lateral dimensions of the defects attributable to extrinsic roughness. Such extrinsic defects are defined herein as irregularly shaped features having positive topography (i.e. features which are above the mean surface level of the film) with substantially no negative topography (i.e. features which are below the mean surface level of the film). If desired, the film can be characterised in terms of the number ($N_E$) of extrinsic defects (as defined above) with a minimum lateral dimension of greater than 7.14 µm, per 31×33 cm area of film surface, and measured by single frame interferometry (SFI) in the LAM technique as described hereinbelow.

The polymeric base layer from which the polymeric protective layer has been removed may then be advantageously used in any application which requires a high-quality defect-free polymeric surface exhibiting high cleanliness and high smoothness. In the present invention, once the polymeric protective layer has been removed, the first surface of the polymeric base layer is then ready for application of the functional layer.

The Functional Layer(s) and Manufacture Thereof

A particular advantage of the present invention is the unexpectedly strong adhesive bond between an ethylene-based copolymeric protective layer and a functional layer comprising zinc and/or tin, as described above. That advantage may be exploited according to the present invention in a number of ways. In one preferred embodiment, a permeation barrier layer comprising zinc and/or tin is disposed directly on the exposed first surface of the base layer, and an ethylene-based copolymeric protective layer is disposed directly on that layer. In other preferred embodiments, a plurality of functional layers is disposed on the base layer, such that the uppermost functional layer comprises zinc and/or tin in order to provide a strong adhesive bond to the subsequently applied ethylene-based copolymeric protective layer.

Typical functional layers include permeation barrier layers, electrically conductive layers, thermally conductive layers, optical adjustment layers, semiconductor layers and photoactive layers, as well as other electronically active layers. As used herein, the term "conductive layer" unless otherwise specified refers to an electrically conductive layer. An optical adjustment layer functions to modulate the transmission spectrum of the multilayer assembly, for instance to block UV light or reduce reflection.

Where there is a plurality of functional layers, each functional layer may be the same or different, and each functional layer may have the same or a different function. Thus, for instance, a permeation barrier layer followed by a conductive layer may be applied to the polymeric base layer. As a further example, first and second permeation barrier layers may be applied to the polymeric base layer, and selected from organic barrier layers and inorganic barrier layers. A plurality of functional layers may be in the form of an optical stack or OLED stack, wherein the uppermost functional layer comprises zinc and/or tin.

Because of the smooth and defect-free nature of the first surface of the polymeric base layer, it is not necessary to apply a planarising layer directly to the first surface of the polymeric base layer in the present invention, and indeed the present invention preferably excludes such a layer. Where a planarising layer is utilised in the present invention then, while not preferred, such a layer may nevertheless be utilised as a functional layer within a plurality of functional layers.

In general, a functional layer may be applied using any conventional technique known in the art, including chemical vapour deposition (CVD), plasma CVD, inductively coupled plasma CVD or capacitively coupled CVD techniques, as well as sputtering and atomic layer deposition (ALD) techniques. Reactive thermal or electron beam evaporation may also be used. Preferably, a functional layer, particularly a permeation barrier layer or a conductive layer, is applied using a vacuum deposition or sputtering process. Alternatively, conventional wet-coating techniques, particularly continuous coating procedures, may be used.

The thickness of the or each functional layer is suitably in the range of from about 1 nm to about 30 µm, more typically from about 5 nm to about 5 µm, depending on the type of functional layer and the method of its application to the polymeric base layer. Thus, for instance, a vacuum-coated or sputtered layer typically has a thickness in the range of from about 5 to about 1000 nm, preferably from about 10 to about 300 nm. A printed or wet-coated functional layer, typically has a thickness of from about 200 nm to about 30 µm preferably no more than about 5 µm.

The uppermost functional layer which comprises zinc and/or tin, as described hereinabove, is preferably a layer wherein said zinc and/or tin is present in an amount of from about 5 to about 80 wt %, preferably from about 5 to about 70 wt %, of said functional layer. Preferably both zinc and tin are present, preferably wherein the mass fraction of zinc is 5% to 70% of said functional layer. The zinc and/or tin are preferably present in the form of their oxide(s). Preferably, said layer comprises a chemical compound of the elements zinc, tin and oxygen, wherein the mass fraction of zinc is 5% to 70%. Preferably, said layer comprises, or consists essentially of or consists of zinc tin oxide (which may be referred to as $Zn_xSn_yO_z$, for instance $Zn_2SnO_4$). Said layer is preferably amorphous, and exhibits an advantageously high permeation barrier, as well as excellent flexibility and resistance to cracking. Such layers are disclosed in US-2010/0136331-A and US-2012/01683010-A.

The thickness of said uppermost functional layer is generally as described above, and preferably in the range of from about 1 nm to about 1000 nm, preferably at least 3 nm, preferably at least about 5 nm, preferably at least about 10 nm, preferably at least about 50 nm, and preferably no more than about 300 nm, preferably no more than about 150 nm, preferably no more than about 100 nm, and preferably from about 3 nm to about 300 nm, preferably from about 50 nm to about 150 nm. An uppermost layer comprising zinc and/or tin may be utilised with one or more other permeation barrier layer(s) (typically with only one other permeation barrier layer, to provide a dual barrier layer), and in such embodiments the thickness of the uppermost layer may be as little as 1 nm, for instance, in the range of from about 1 nm to about 20 nm, and preferably at least 5 nm. More generally, in embodiments where the barrier performance of the uppermost layer comprising zinc and/or tin is not critical to the performance of the multilayer assembly, the thickness of said uppermost layer may be as little as 1 nm, typically from about 1 nm to about 20 nm, and preferably at least 5 nm. Where the uppermost layer comprising zinc and/or tin is the only, or primary, permeation barrier layer then its thickness is typically at least 10 nm, as described in further detail hereinbelow.

In a particularly preferred embodiment, a functional layer is a permeation barrier layer, i.e. a layer which provides high resistance to gas permeation (particularly oxygen and water vapour) and preferably also to solvent permeation. In one advantageous embodiment, there is a single functional layer between the polymeric base layer and a polymeric protective layer, and this functional layer is a permeation barrier layer. Where a plurality of functional layers is disposed on said polymeric base layer then it is preferred that at least one of said functional layers is a permeation barrier layer.

A permeation barrier layer preferably has a thickness range of from about 10 nm to about 1000 nm, preferably from about 50 nm to about 300 nm, preferably at least about 50 nm, and preferably no more than about 150 nm, preferably no more than about 100 nm.

A permeation barrier layer may be organic or inorganic, should exhibit good affinity for the layer deposited thereupon, and be capable of forming a smooth surface. Materials which are suitable as a permeation barrier layer are disclosed, for instance, in U.S. Pat. No. 6,198,217. Typical organic barrier layers include photocurable monomers or oligomers, or thermoplastic resins. Photocurable monomers or oligomers should have low volatility and high melting points. Examples of such monomers include trimethylol acrylates such as trimethylolpropane triacrylate, ditrimethylolpropane tetraacrylate and the like; long-chain acrylates such as 1,6-hexanediol diacrylate, 1,6-hexanediol dimethacrylate and the like; and cyclohexyl acrylates such as dicyclopentenyloxyethyl acrylate, dicyclopentenyloxy acrylate, cyclohexyl methacrylate and the like. Examples of such oligomers include acrylate oligomers, epoxy acrylate oligomers, urethane acrylate oligomers, ether acrylate oligomers, and the like. Photoinitiators, such as benzoin ethers, benzophenones, acetophenones, ketals and the like, may be used to cure the resin. Examples of suitable thermoplastic resins include polyethylene, polymethyl methacrylate, polyethylene terephthalate and the like. These organic materials may be applied by vacuum deposition, but more typically by atmospheric pressure coating processes such as slot-die coating, gravure and reverse gravure coating, ductor blade coating and the like. Typical inorganic barrier layers are made of a material which exhibits low moisture permeability and is stable against moisture. Examples include oxides such as $SiO_2$, SiO, GeO, $Al_2O_3$, $ZrO_2$, $TiO_2$ and the like, nitrides such as TiN, $Si_3N_4$, AlN and the like, and composites of those. Metals such as Al, Ag, Au, Pt, Ni and the like may also be used. The inorganic material is preferably applied using a vapour phase technique as described above. An inorganic barrier layer is preferred.

An optically clear barrier layer is often preferred, particularly an optically clear inorganic barrier layer.

In a particularly preferred embodiment, a permeation barrier layer is said layer which comprises zinc and/or tin, as described in more detail hereinabove.

In general, a permeation barrier layer is preferably applied in a vapour phase technique, such as a vacuum deposition process, atomic layer deposition or a sputtering process, or reactive thermal or electron beam evaporation, under conditions conventional in the art. An example of a suitable vacuum deposition process is magnetron sputtering. A reactive sputtering process is of particular utility in the present invention.

A layer comprising zinc and/or tin is preferably prepared by sputtering a target of zinc and/or tin in the presence of oxygen as the reactive gas, and a suitable inert gas. To achieve uniform barrier properties across the film surface, the layer thickness should also be uniform. As is known in the art, the thickness of the deposited layer is advantageously adjusted via the supply of the reactive gas into the vacuum chamber, and typically the oxygen inlet is controlled by means of a control loop. Preferably, a controlled variable for controlling the oxygen inlet is determined from the optical emission spectrum of the sputtering plasma. The quotient of an emission line of zinc or tin and an emission line of the inert gas used may be determined as a controlled variable, as taught in US-2010/0136331-A.

Preferably, a film comprising a permeation barrier layer exhibits a water vapour transmission rate (WVTR) of less than $10^{-2}$ g/m²/day more preferably less than $10^{-3}$ g/m²/day, more preferably less than $10^{-4}$ g/m²/day, more preferably less than $10^{-5}$ g/m²/day, most preferably less than $10^{-6}$ g/m²/day, and/or an oxygen transmission rate (OTR) of less than $10^{-3}$ mL/m²/day, more preferably less than $10^{-4}$ mL/m²/day, most preferably less than $10^{-5}$ mL/m²/day, measured as described herein.

In a further embodiment, a functional layer may be a conductive layer. Suitable conductive layers are described hereinbelow.

The Multi-Layer Assembly and Manufacture Thereof

In the next stage of the process (step (iv)), a polymeric protective layer is applied to the exposed surface of said functional layer comprising zinc and/or tin, to provide a multilayer assembly. The polymeric protective layer disposed in step (iv) is or comprises an ethylene-based copolymer, as described hereinabove.

The polymeric protective layer which is disposed in step (iv) may be the same polymeric protective layer which was removed from the first surface of the polymeric base layer of the composite film in step (ii). Alternatively, the polymeric protective layer which is disposed in step (iv) may be a further polymeric protective layer which is not the same polymeric protective layer that was removed in step (ii) of the process, and in this embodiment preferably said further polymeric protective layer disposed in step (iv) has previously been removed from an analogous composite film as defined hereinabove in a manner as defined in step (ii).

In step (iv), it is preferred that the polymeric protective layer is disposed onto the exposed surface of said functional layer such that the first surface of the polymeric protective layer contacts the exposed surface of said functional layer of the multi-layer substrate. In other words, the "clean" surface which was formerly in contact with the first surface of said polymeric base layer prior to the removal of the polymeric protective layer in step (ii) of the process, is contacted with the exposed surface of the, or the uppermost, functional layer of the multi-layer substrate.

In step (iv), the polymeric protective layer is brought into contact with the exposed surface of said functional layer in the absence of any additional adhesive between the first surface of the polymeric protective layer and the exposed surface of said functional layer. The inventors surprisingly observed that high temperatures and/or pressures are not required in order to achieve a strong adhesive bond between the polymeric protective layer and said functional layer. Thus, step (iv) may be conducted at ambient temperature (20° C.). Preferably, the temperature in step (iv) does not exceed 150° C. Similarly, the contacting step does not require high pressures, and may be conducted under pressures typically experienced in a roll-to-roll process, typically less than about 3 bar.

The inventors have observed that the adhesive bond strength between the polymeric protective layer and the, or the uppermost, functional layer is surprisingly strong, in particular such that the peel force is at least 1.5 N/cm, preferably at least 2 N/cm, preferably greater than 2.5N/cm, preferably at least 3 N/cm, preferably at least 4 N/cm, preferably at least 5 N/cm, preferably at least 6 N/cm, as measured by the 90° peel test of ISO9211-4:2006.

The adhesive bond strength ($S_{P-F}$) between the polymeric protective layer and said functional layer is preferably greater than the adhesive bond strength ($S_{P-B}$) between the polymeric protective layer and the polymeric base layer, preferably such that $S_{P-F} \geq 1.5\ S_{P-B}$, and preferably $S_{P-F} \geq 2\ S_{P-B}$, preferably $S_{P-F} \geq 3\ S_{P-B}$, preferably $S_{P-F} \geq 5\ S_{P-B}$, preferably $S_{P-F} \geq 8\ S_{P-B}$, preferably $S_{P-F} \geq 10$ SP-B, preferably $S_{P-F} \geq 12\ S_{P-B}$.

The preparation of the multi-layer assembly is preferably a roll-to-roll process (also known as a "reel-to-reel" process) comprising a plurality of rollers, including guide rollers and conveying rollers, and preferably also a process drum for deposition of the functional layer. Preferably, contact between the surface of the rollers and the exposed first surface of the polymeric base layer is avoided. It will be appreciated that the exposed first surface of the polymeric base layer should not come into contact with a roller or other material, prior to the deposition of the, or the first, functional layer thereon. Preferably, contact between the surface of the rollers and an exposed surface of a functional layer is also avoided according to the present invention. It is also preferred that contact between the surface of the rollers and the first surface of the polymeric protective layer is avoided.

The method of the invention is preferably a continuous process.

Preferably, steps (ii) and (iii), and preferably also step (iv), are conducted in a sealed chamber or other clean environment in order to avoid contamination of the first surface of the polymeric base layer, and preferably also the first surface of the polymeric protective layer, for instance with airborne particles. Preferably, the process is conducted in a clean-room class 10 (i.e. 10 particles per m$^3$) or cleaner.

Preferably, steps (ii) and (iii), and preferably also step (iv), are conducted in a de-pressurised or evacuated chamber, preferably a vacuum chamber. At least step (iii) is suitably conducted in a vacuum deposition chamber. Alternatively, the deposition step, or the process as a whole, may be implemented at atmospheric pressure, for instance in a roll-to-roll ALD coating technique.

In a preferred embodiment, steps (ii), (iii) and (iv) are conducted in the same chamber.

However, in the method of the present invention, step (iii) may also be conducted in a chamber which is separate from the chamber in which step (ii) is conducted and/or the chamber in which step (iii) is conducted. For instance, step (ii) may be conducted in a supply chamber, step (iii) may be conducted in a deposition chamber, and step (iv) may be conducted in a wind-up chamber, as disclosed in EP-2312015-A and EP-2228463-A. In this embodiment, the film is suitably conveyed between respective chambers through a slit in the partition wall which divides the chambers. Where separate chambers are utilised, an evacuation device may be connected to each chamber, or may be connected only to the chamber in which step (iii) is conducted.

There are three principal arrangements for deposition of a functional layer in step (iii). In a particularly preferred embodiment, the deposition of a functional layer is effected while the polymeric base layer is in mechanical contact with a process drum. The process drum may be at ambient temperature, or cooled or heated. In a further preferred embodiment, the deposition of a functional layer may be effected while the polymeric base layer is fed via a conveyor, or belt, typically wherein the polymeric base layer is in a flat or planar configuration during deposition of a said functional layer. In a further preferred embodiment, the polymeric base layer is conveyed in a so-called "free-span" configuration, i.e. wherein the second surface of the polymeric base layer is not contacted by a support, during the deposition of a functional layer.

In step (ii) of the process, the polymeric protective layer may be removed from the polymeric base layer before or after the composite film comprising said base and protective layers is contacted with one of the afore-mentioned support means (i.e. process drum, conveyor or belt). In the free-span configuration, removal of the polymeric protective layer is suitably effected while the polymeric base layer is moving on a roller. In all cases, it is preferred that the second surface of the polymeric protective layer is in mechanical contact with the surface of a guide roller at or near the point of removal of the polymeric protective layer from the polymeric base layer, in order to facilitate a substantially constant removal angle between the two layers.

It will be appreciated that the process described herein is typically initiated by manually separating the polymeric protective layer from the polymeric base layer and affixing the polymeric protective layer to the winding reel, or other destination. Where the polymeric protective layer is wound onto a winding reel, typically the first 2 to 5 metres of the polymeric protective layer is wound on the winding reel at the start of the process.

Figure 2:
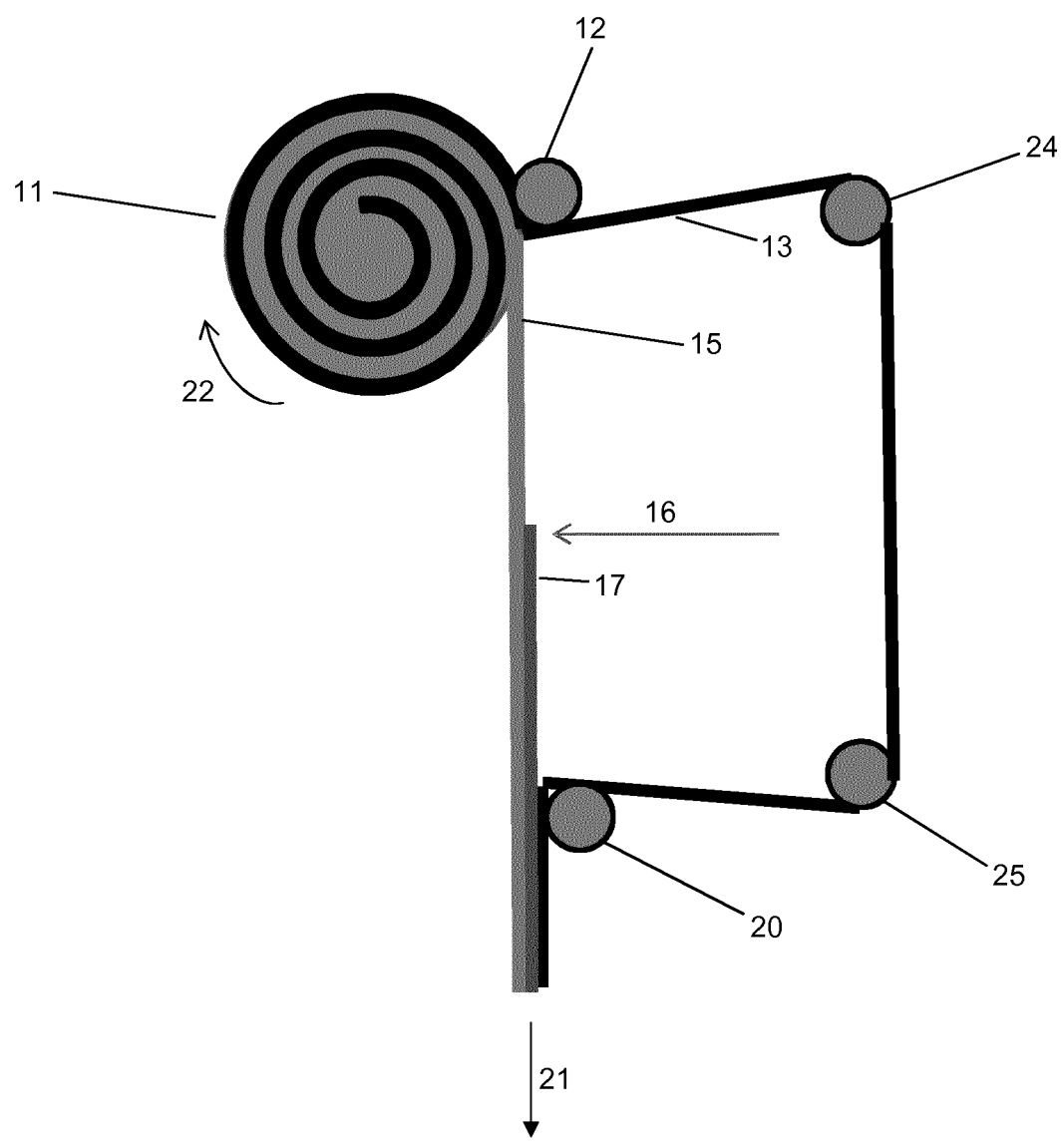

During the process described herein, once the polymeric protective layer has been removed from the first surface of the base layer, it may be wound onto a motor-driven carrier roll, typically via one or more intermediate guide rollers, as shown for instance in the arrangement of FIG. 1. Where the same polymeric protective layer is re-united with the same polymeric base layer from which it is removed, for instance as shown in FIG. 2, the polymeric protective layer is suitably conveyed by a plurality of guide rollers.

Preferably, step (ii) of the process is conducted by contacting the composite film comprising the polymeric base layer and the polymeric protective layer with a process drum, such that the polymeric base layer (and specifically the second surface thereof) is in mechanical contact with the surface of the drum or roller, and subsequently removing the protective layer. Preferably, a functional layer is deposited in step (iii) while the base layer is in mechanical contact with said drum.

Preferably, step (iv) of the process is conducted by contacting a polymeric protective layer onto the exposed surface of the functional layer while the polymeric base layer remains in mechanical contact with the surface of said support means (preferably said process drum) and before the polymeric base layer loses mechanical contact with said support means (preferably said process drum). Step (iv) may also be conducted by contacting a polymeric protective layer onto the exposed surface of the functional layer after the functionalised polymeric base layer has been conveyed away from the process drum or other support means used for depositing the functional layer onto the polymeric base layer. In the free-span configuration described above, the disposing of the polymeric protective layer in step (iv) is suitably effected while the functionalised polymeric base layer is conveyed by a roller. In all cases, during step (iv) of the process, it is preferred that the second surface of a polymeric protective layer is in mechanical contact with the surface of a guide roller at or near the point of application of the polymeric protective layer to the, or the uppermost, functional layer.

In a preferred embodiment, the second surface of the polymeric base layer is in mechanical contact with the same process drum during the performance of steps (ii), (iii) and (iv).

In a typical operation, the composite film comprising polymeric base layer and polymeric protective layer is unwound from a roll and continuously fed through the chamber in which the functional layer is to be deposited. Once the composite film has entered the chamber, the polymeric protective layer is peeled away to reveal the pristine first surface of the polymeric base layer, on which is deposited one or more functional layer(s) as described hereinabove. A polymeric protective layer, preferably the same film which was previously peeled away from the base layer, is then disposed on the first surface of said functional layer, and preferably this step is also conducted in said chamber. The resulting multi-layer assembly may then undergo further processing, for instance by the application of further layers, or it may be simply re-wound into a film roll. The process is represented in FIGS. 1, 2 and 3.

FIG. 1 illustrates a process in which the polymeric protective layer is re-used indirectly. A reel 11 of composite film comprising a polymeric base layer and a polymeric protective layer is unwound in the direction of arrow 22. The protective layer is separated from the base layer at roller 12 to expose a freshly peeled first surface 15 of the polymeric base layer and a first surface 13 of the protective layer. The protective layer is then wound in the direction 23 into reel 14. Material for the functional layer 17 is then deposited from the direction of arrow 16 onto the first surface 15 of the polymeric base layer. A further polymeric protective layer 18 is unwound from reel 19 and contacted with the functional layer at roller 20. The multi-layer assembly is then conveyed in the direction of arrow 21 for further processing or winding into a reel.

FIG. 2 illustrates a process in which the polymeric protective layer is re-used directly. The process corresponds with that illustrated in FIG. 1 except that, once peeled, the protective layer is conveyed by rollers 24 and 25 and then reunited by roller 20 with the base layer from which is was peeled, where it is contacted with the exposed surface of the functional layer.

Figure 3:
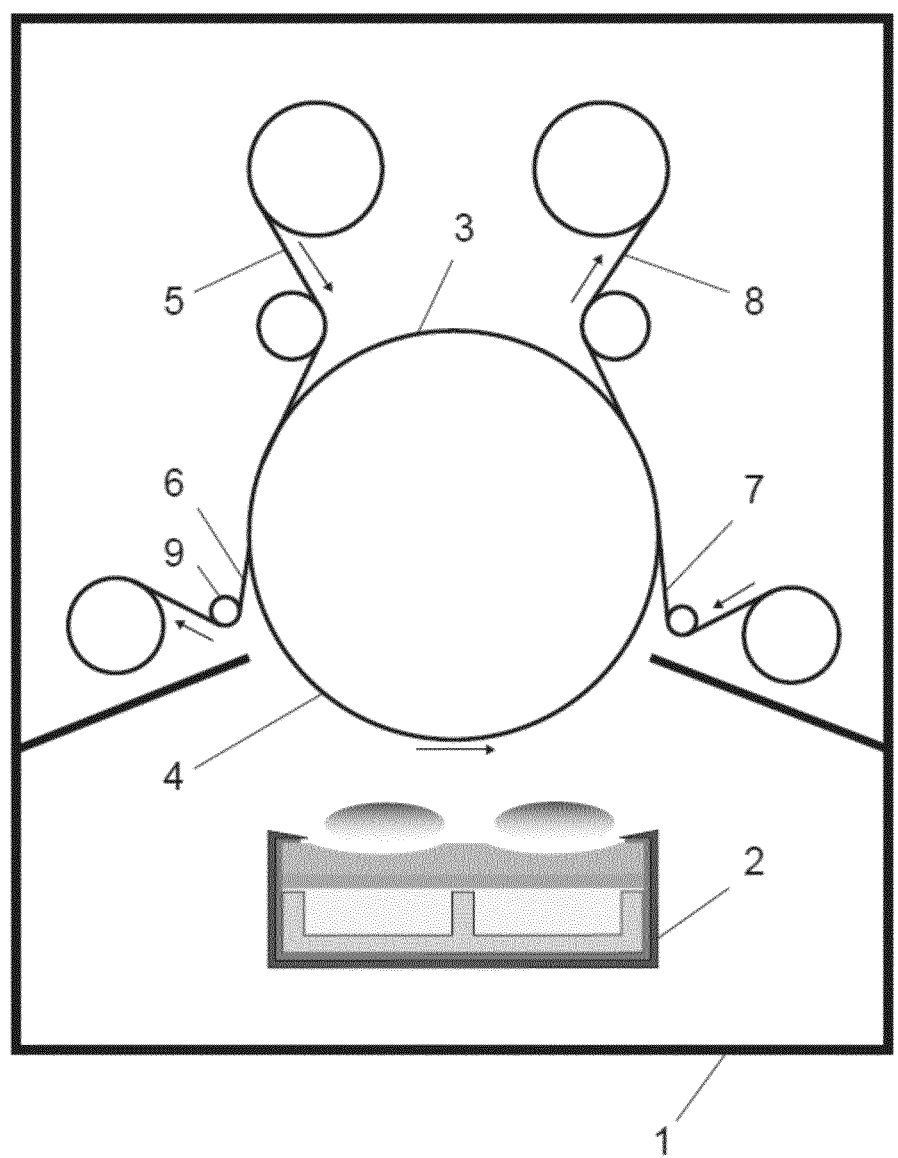

FIG. 3 shows the deposition of a functional layer on a polymeric base layer 4 which is guided along a process drum 3. Thus, composite film 5 comprising the polymeric base layer 4 and polymeric protective layer 6 is unwound from a reel and passed to process drum 3, making mechanical contact therewith. The protective layer 6 is then removed and passed via roller 9 to a winding stage. Material is deposited onto the exposed first surface of the polymeric base layer from deposition source 2 to provide a functional layer. A further polymeric protective layer 7 is then disposed onto the exposed surface of the functional layer while the polymeric base layer remains in mechanical contact with the process drum 3 and before the polymeric base layer loses mechanical contact with process drum (3).

The multi-layer assembly described herein may comprise a single polymeric protective layer or may comprise multiple polymeric protective layers. Where the multi-layer assembly comprises multiple polymeric protective layers, the polymeric protective layers are separated from each other by one or more functional layer(s) therebetween. Where multiple polymeric protective layers are present, a polymeric protective layer is preferably disposed on a functional layer comprising zinc and/or tin as described herein. Where multiple polymeric protective layers are present, a polymeric protective layer which is disposed internally (i.e. within the multi-layer stack) a functional layer comprising zinc and/or tin may be disposed thereupon before application of the subsequent layer, in order to increase delamination resistance. Thus, the method of the first aspect may comprise, after the completion of step (iv), the further steps of:

(iv-a) disposing on the surface of said polymeric protective layer one or more functional layers, wherein the, or at least the uppermost, functional layer comprises zinc and/or tin in an amount of from about 5 to about 80 wt % of said functional layer; and (iv-b) disposing a subsequent polymeric protective layer comprising an ethylene-based copolymer onto the exposed surface of the, or at least the uppermost, functional layer.

Steps (iv-a) and (iv-b) may be repeated one or more times. Where these steps are repeated, there may be intervening process steps (for instance to dispose one or more other functional layer(s)) between each cycle of steps (iv-a) and (iv-b).

In this way, a stack of functional layers and polymeric protective layers may be built up on a polymeric base layer.

The multi-layer assembly of the present invention is particularly suitable as a permeation barrier film or an encapsulation film, particularly as a substrate or layer in an electronic device, or the multi-layer assembly of the present invention may be the electronic device itself. The electronic device may be an opto-electronic device. Of particular interest are electronic devices selected from electroluminescent (EL) display devices (particularly organic light emitting diodes (OLED) devices and inorganic electroluminescent devices), electrophoretic displays (e-paper), photovoltaic (PV) cells and semiconductor devices (such as organic field effect transistors, thin film transistors, printed sensors, printed batteries, and integrated or printed circuits generally), particularly flexible such devices. A permeation barrier film is also of particular utility as packaging, particularly food packaging. Other applications include the provision of optical films, medical devices and decorative films.

In a preferred embodiment, the multi-layer assembly of the present invention is optically clear, preferably having the ranges of haze and TLT described hereinabove for the polymeric base layer.

Thus, according to a second aspect of the invention, there is provided a method of manufacture of an electronic device, said method comprising the steps of:

(i) providing a composite film comprising a polymeric base layer having a first and second surface and disposed on the first surface thereof a polymeric protective layer having a first surface and a second surface such that the first surface of said base layer is in contact with the first surface of the polymeric protective layer, wherein said polymeric protective layer comprises an ethylene-based copolymer, and preferably wherein the polymeric base layer comprises a polyester derived from: (i) one or more diol(s); (ii) one or more dicarboxylic acid(s);

(ii) removing said polymeric protective layer from the first surface of said base layer;

(iii) disposing on the exposed first surface of said base layer one or more functional layers to provide a multi-layer substrate, wherein the, or at least the uppermost, functional layer comprises zinc and/or tin in an amount of from about 5 to about 80 wt % of said functional layer;

(iv) disposing a polymeric protective layer comprising an ethylene-based copolymer onto the exposed surface of the, or at least the uppermost, functional layer to provide a multi-layer assembly; and (v) providing one or more conductive layer(s) and/or semiconductor layer(s) within or on said multi-layer assembly, preferably by disposing said one or more conductive layer(s) and/or semiconductor layer(s) onto the surface of said polymeric protective layer of said multi-layer assembly.

The description hereinabove in respect of the method, materials and properties of the first aspect applies also to the second aspect of the invention.

Conductive and semi-conductor materials suitable for the formation of conductive and semi-conductor thin layers in electronic devices generally, and particularly flexible electronic devices, are well known in the art. A conductive layer typically comprises at least one of Au, Ag, In, Al, Sn and/or Zn. Suitable conductive layers include silver, gold and/or aluminium layers, doped zinc oxide layers and ZnO/silver/ZnO layer stacks. Metallic oxide layers, and particularly mixed metal oxide layers are of particular utility, for instance indium tin oxide. Organic conductive layers may also be used, including small molecule organic semiconductors as well as materials comprising conjugated polymers, such as PEDOT:PSS (poly(3,4-ethylenedioxythiophene) polystyrene sulfonate.

A conductive or semi-conductor layer is preferably optically clear. Preferably, the structure comprising a polymeric base layer a functional layer and a polymeric protective layer (i.e. the multi-layer assembly produced by the first aspect of the present invention) and further comprising an optically clear conductive and/or or semi-conductor layer is optically clear, preferably having the ranges of haze and TLT described hereinabove for the polymeric base layer. Metallic oxides, and particularly mixed metal oxides, preferably indium tin oxide is particularly useful as an optically clear conductive layer. The PEDOT:PSS organic material noted above is also useful as an optically clear conductive layer.

The electronic device typically further comprises the various functional layers conventional in the art for incorporation into such devices, as well as the usual components to collect and manage the electrical charge. Functional layers preferably include, for example, one or more photo-active or other electronically active layer(s), a further electrode layer and an encapsulation layer. Such layers may be applied to the surface of a conductive or semiconductor layer using conventional techniques in the art, and particularly to the surface of such a conductive or semiconductor layer in the preferred embodiment described hereinabove. For instance, an electronic device of the present invention suitably comprises, in this order: a multi-layer assembly according to the first aspect of the present invention; a conductive or semiconductor layer (preferably transparent); a functional layer and a cathode; and preferably also an encapsulant layer.

The encapsulant layer may itself be a multi-layer assembly according to the first aspect of the present invention. Thus, a further, independent use of the multi-layer assembly disclosed herein is as an encapsulant film.

In a preferred embodiment, a functional layer of an electronic device may be a photo-active layer, for instance a light-emitting organic layer in an OLED light source or light-sensitive organic layer in a photovoltaic cell.

Photovoltaic cells generally comprise a front-plane (or front-sheet); a front-side encapsulant material; the photoactive material on an electrode support; a rear-side encapsulant; a rear back-plane (or back-sheet); and various components to collect and manage the electrical charge. The multi-layer assembly disclosed herein may be used, for instance as the front-plane, the back-plane, an encapsulant layer and/or an electrode support layer.

As noted hereinabove, a particular advantage of the present invention is that an encapsulant layer may be adhered directly to the polymeric protective layer, i.e. without an intervening or additional adhesive layer. Suitable encapsulant materials include ethylene vinyl acetate (EVA) copolymer resins, commercially available for instance as Elvax® resins (DuPont, for instance grades PV1410 to PV1650Z), typically wherein the vinyl acetate component is in the range of from about 28 to about 33 wt %. Other suitable encapsulant materials are selected from polyvinylbutyral resins, also commercially available from DuPont (for instance the PV5200 series), and from silicone resins (for instance, Dow Corning's PV-6100 series of optically clear silicone encapsulants). Other suitable encapsulant materials are selected from ionomer-based materials, i.e. a polymer made up primarily of non-polar repeat units with a minor proportion (typically no more than about 15 wt %) of salt-containing units, for instance thermoplastic carboxylate ionomers wherein the non-polar comonomers are typically selected from ethylene and styrene (preferably ethylene), and containing a minor proportion of salt-containing units such as metal salts (for instance, alkali metal or zinc salts) of methacrylic acid and/or acrylic acid. Preferred ionomers for encapsulant materials include the copolymers of ethylene and methacrylic acid and/or acrylic acid partially or completely neutralised with alkali metals or zinc, for instance Surlyn® (DuPont; for instance grade 1702).

According to a third aspect of the invention, there is provided a multi-layer assembly comprising:
(i) a polymeric base layer having a first and second surface, preferably wherein said base layer comprises a polyester derived from one or more diol(s) and one or more dicarboxylic acid(s);
(ii) one or more functional layers disposed on the first surface of said base layer, wherein the, or at least the uppermost, functional layer comprises zinc and/or tin in an amount of from about 5 to about 80 wt % of said functional layer; and
(iii) a polymeric protective layer comprising an ethylene-based copolymer disposed onto the surface of the, or at least the uppermost, functional layer.

The description hereinabove in respect of the materials, properties and method of manufacture of the first aspect applies also to the third aspect of the invention.

Said polymeric protective layer has a first surface and a second surface, and is preferably derived from a composite film comprising a polymeric base layer having a first and second surface and disposed on the first surface thereof said polymeric protective layer such that the first surface of said base layer is in contact with the first surface of said polymeric protective layer, preferably wherein said base layer comprises a polyester derived from one or more diol(s) and one or more dicarboxylic acid(s), wherein the polymeric protective layer is removed from the first surface of said base layer of said biaxially oriented composite film prior to disposing it onto the surface of the, or at least the uppermost, functional layer comprising zinc and/or tin. In one embodiment, the polymeric base layer of the composite film from which the polymeric protective layer is removed is the polymeric base layer of the multi-layer assembly.

It is preferred that said polymeric protective layer, having a first and second surface, is disposed onto the exposed surface of the, or at least the uppermost, functional layer comprising zinc and/or tin such that the second surface of said polymeric protective layer contacts the exposed surface of said functional layer.

In the multi-layer assembly of the third aspect, it is preferred that said polymeric protective layer is disposed onto the exposed surface of the, or at least the uppermost, functional layer comprising zinc and/or tin in the absence of any additional adhesive between the first surface of the polymeric protective layer and the exposed surface of said functional layer.

According to a fourth aspect of the invention, there is provided an electronic device comprising a multi-layer assembly comprising:
(i) a polymeric base layer having a first and second surface, preferably wherein said base layer comprises a polyester derived from one or more diol(s) and one or more dicarboxylic acid(s);
(ii) one or more functional layers disposed on the first surface of said base layer, wherein the, or at least the uppermost, functional layer comprises zinc and/or tin in an amount of from about 5 to about 80 wt % of said functional layer; and
(iii) a polymeric protective layer comprising an ethylene-based copolymer disposed onto the surface of the, or at least the uppermost, functional layer comprising zinc and/or tin;
and wherein said electronic device further comprises:
(iv) one or more conductive layer(s) and/or semiconductor layer(s) within or on said multi-layer assembly, preferably wherein said one or more conductive layer(s) and/or semiconductor layer(s) is disposed on the surface of a polymeric protective layer of said multi-layer assembly.

Preferably, the electronic device further comprises an encapsulant layer, typically to protect it from moisture ingress. Preferably, the outer layer of the multi-layer assembly in the electronic device is a polymeric protective layer which is in direct contact with said encapsulant layer without an intervening adhesive layer.

The description hereinabove in respect of the materials, properties and method of manufacture of the second aspect applies also to the fourth aspect of the invention.

According to a fifth aspect of the invention, there is provided a composite film as described hereinabove for the first aspect of the invention, which is a coextruded biaxially oriented composite film.

Property Measurement

The following analyses were used to characterize the films described herein:

(i) Clarity may be evaluated by measuring total luminance transmission (TLT) and haze (% of scattered transmitted visible light) through the total thickness of the film using an M57D spherical hazemeter (Diffusion Systems) according to ASTM D1003.

(ii) Transmission Optical Density (TOD) may be measured using a Macbeth Densitometer TR 927 (obtained from Dent and Woods Ltd, Basingstoke, UK) in transmission mode.

(iii) Intrinsic viscosity (in units of dL/g) may be measured by solution viscometry in accordance with ASTM D5225-98(2003) on a Viscotek™ Y-501C Relative Viscometer (see, for instance, Hitchcock, Hammons & Yau in American Laboratory (August 1994) "The dual-capillary method for modern-day viscometry") by using a 0.5% by weight solution of polyester in o-chlorophenol at 25° C. and using the Billmeyer single-point method to calculate intrinsic viscosity:

$$\eta = 0.25\eta_{red} + 0.75(\ln\eta_{rel})/c$$

wherein:
$\eta$ = the intrinsic viscosity (in dL/g),
$\eta_{rel}$ = the relative viscosity,
c = the concentration (in g/dL), &
$\eta_{red}$ = reduced viscosity (in dL/g), which is equivalent to $(\eta_{rel}-1)c$ (also expressed as $\eta_{sp}/c$ where $\eta_{sp}$ is the specific viscosity).

(iv) Thermal shrinkage is assessed for film samples of dimensions 200 mm×10 mm which were cut in specific directions relative to the machine and transverse directions of the film and marked for visual measurement. The longer dimension of the sample (i.e. the 200 mm dimension) corresponds to the film direction for which shrinkage is being tested, i.e. for the assessment of shrinkage in the machine direction, the 200 mm dimension of the test sample is oriented along the machine direction of the film. After heating the specimen to the predetermined temperature of 150° C. (by placing in a heated oven at that temperature) and holding for an interval of 30 minutes, it was cooled to room temperature and its dimensions re-measured manually. The thermal shrinkage was calculated and expressed as a percentage of the original length.

(v) Melt Flow Index (MFI) is measured herein according to ASTM D1238 or ISO-1133, depending on the polymer used. The ethylene-based copolymers used in the present invention are analysed in accordance with ASTM D1238 at a temperature of 190° C. and a mass of 2.16 kg. Suitable MFI ranges for the ethylene-based (particularly the EMAA or EAA) copolymers used in the present invention are in the range from about 0.5 to about 50 g/10 min, preferably from about 1 to about 25 g/10 min, typically from about 2 to about 20 g/10 min, and more typically from about 2 to about 15 g/10 min.

(vi) Layer thickness is measured by Mercer 122D gauge.

(vii) MD lines are localised high spots or circumferential bands on reels caused by poor film thickness profile and/or reel buckling. Die lines are straight lines in the machine direction that remain in the same location on the melt during filming. Flow lines are lines in the machine or transverse direction that do not remain in the same location on the melt during filming; they are thought to be caused by the transient or migratory presence of polymeric spherical gels (cross-linked) which cause a disturbance in the polymer curtain. The presence of each of these defects in the film was assessed qualitatively by visual inspection by the naked eye (i.e. without a microscope).

(viii) Scratches are low amplitude (typically up to about 1000 nm deep and up to about 1000 nm wide) elongated depressions in the film. They are thought to result from imperfections in the die and rollers used in film manufacture, or from film handling. Scratches are classified herein as intrinsic surface defects, and their presence in the film was assessed qualitatively by optical microscopy (at 2.5× magnification). Of course, extrinsic surface roughness resulting from handling damage during storage or transport can also include the scratching of the film surface, but such defects are not measured herein.

(ix) The adhesive strength between the polymeric protective layer and the polymeric base layer is assessed by measuring the peel force on an SST-3 Seal Strength Tester (RDM Test Equipment) as follows. 10 mm wide strips of film are cut from the web using a thick film tool. If the polymeric protective layer is well-adhered a piece of adhesive tape (Tesa 4104) is used to lift the polymeric protective layer from the polymeric base layer. The polymeric protective layer is then attached to double-sided tape on the upper jaw of the equipment, and the polymeric base layer is attached to double-sided tape on the lower jaw. The reading is set to zero before the jaws are moved apart, and the jaws then moved apart at 240 mm/min. The peak value of the force recorded to separate the layers is recorded. The results are averaged from three measurements. The apparatus is reset between samples to reset the peak.

(x) The adhesive strength between the functional layer and the polymeric protective layer is assessed by the 90° peel test of ISO9211-4:2006, using a Sebastian Five Peel Test unit.

(xi) The "micro-roughness" of the surface of the polymeric base layer in fields of view (defined below) selected to be remote from any major surface defects is characterised using conventional non-contacting, white-light, phase-shifting interferometry techniques, which are well-known in the art, using a Wyko NT3300 surface profiler using a light source of wavelength 604 nm. With reference to the WYKO Surface Profiler Technical Reference Manual (Veeco Process Metrology, Arizona, US; June 1998; the disclosure of which is incorporated herein by reference), the characterising data obtainable using the technique include:

Averaging Parameter—Roughness Average (Ra): the arithmetic average of the absolute values of the measured height deviations within the evaluation area and measured from the mean surface.

Averaging Parameter—Root Mean Square Roughness (Rq): the root mean square average of the measured height deviations within the evaluation area and measured from the mean surface.

Peak-to-Valley value ($PV_{95}$): this parameter may be obtained from the frequency distribution of positive and negative surface heights as a function of surface height referenced to the mean surface plane. The value $PV_{95}$ is the peak-to-valley height difference which envelops 95% of the peak-to-valley surface height data in the distribution curve by omitting the highest and lowest 2.5% of datapoints. The $PV_{95}$ parameter provides a statistically significant measure of the overall peak-to-valley spread of surface heights.

The roughness parameters and peak heights are measured relative to the average level of the sample surface area, or "mean surface", in accordance with conventional techniques. (A polymeric film surface may not be perfectly flat, and often has gentle undulations across its surface. The mean surface is a plane that runs centrally through undulations and surface height departures, dividing the profile such that there are equal volumes above and below the mean surface.) The surface profile analysis is conducted by scanning discrete regions of the film surface (between and remote from major defects) within the "field of view" of the surface profiler instrument, which is the area scanned in a single measurement. A film sample may be analysed using a discrete field of view, or by scanning successive fields of view to form an array. The analyses conducted herein utilised the full resolution of the Wyko NT3300 surface profiler, in which each field of view comprises 480×736 pixels. For the measurement of Ra and Rq, the resolution was enhanced using an objective lens having a 50-times magnification. The resultant field of view has dimensions of 90 μm×120 μm, with a pixel size of 0.163 μm. The results of five successive scans over the same portion of the surface area are combined to give an average value. The measurements were conducted using a modulation threshold (a user-determined parameter based on the minimal acceptable signal-to-noise ratio) of 10%, i.e. data points below the threshold are identified as unreliable.

(xii) The macro-roughness of the surface of the polymeric base layer may be analysed by large-area metrology (LAM) using a Wyko SSP9910 Single Frame Interferometer, also equipped with both PSI and VSI capability, in order to arrive at values for the parameters of Maximum Profile Peak Height (Rp) and Maximum Profile Crater Depth (Rv), defined as the height (or depth) of the highest peak (or crater/trough) in the evaluation area, as measured from the mean surface. The measurement area of the film was 31×33 cm.

The first step of the technique is to conduct measurements in the SFI (Single Frame Interferometry) mode to produce a low magnification (×2.5) map in order to determine the location of major surface defects in the film area studied. In the SFI mode, the modulation threshold was set at 1%, and the cut-off threshold (another user-determined parameter selected to define the minimum vertical amplitude constituting a major surface defect) was set at 0.25 μm above the mean surface. The skilled man will appreciate that for some laterally smaller defects the pixel size is large in comparison with the peak area in SFI mode, and so at this low magnification the measured peak height measured (which is averaged over the pixel) may be weighted downwards as a result of the larger pixel area. Thus, intrinsic defects in SFI mode are defined as those having a peak height of at least 0.25 μm and spanning greater than 2 adjoining pixels (1 pixel=3.57 μm); and extrinsic defects were considered as those spanning at least 3 adjoining but not necessarily co-linear pixels (7.14 μm in at least one lateral dimension). Intrinsic and extrinsic defects were differentiated herein according to the reflectance profile (extrinsic defects exhibit a reflectance profile which is different from the polyester matrix and typically exhibit a lower reflectance). Intrinsic and extrinsic defects may also be differentiated according to the lateral profile of the defect. The first step in the technique produces (x,y)-coordinates of all the user-defined defects in the film surface.

The second step of the technique is to re-examine the film surface using the same equipment in either phase shifting interferometry (PSI) mode or vertical scanning interferometry mode (VSI) to produce a high magnification (×25) map. The skilled man will appreciate that PSI mode is generally appropriate for smoother surfaces where the height difference between adjoining pixels does not lead to data loss. In contrast, VSI mode is more suited to relatively rougher surfaces in order to avoid such data loss. In the second step the instrument revisits the defects identified by their (x,y)-coordinates determined in the first step, in order to yield more precise information about those regions of the film sample in which major surface defects were located, and it is the major intrinsic surface defects which are of primary interest here. In the PSI mode, the cut-off threshold was set at 0.25 μm above the mean surface and the modulation threshold was set at 10%. In the VSI mode, the cut-off threshold was also set at 0.25 μm and the modulation threshold was set at 0.2%. In the PSI mode, the relatively higher modulation threshold means that the extrinsic defects can be inferred from "data-loss" regions. Intrinsic defects were considered as those covering at least 9 adjoining but not necessarily co-linear pixels (1 pixel=0.35 μm) and at least 0.25 μm in peak height. The values described herein for NDT, $N_{PP}$ and $N_{GS}$ are derived from the PSI scans or VSI scans, as appropriate, and particularly from the PSI scans.

(xiii) Melting temperature is determined by differential scanning calorimetry (DSC) according to ASTM D3418.

(xiv) The VICAT softening point is determined by ASTM D1525.

(xv) The water vapour transmission rate (in g/m²/day) of the composite film was measured on a sample area of 78 cm² using a BRUGGER WDDG coulometric device according to ISO 15106-3 (38° C./90% RH (relative humidity)). Unless specified otherwise, WVTR values referred to herein are those at measured at 38° C. and 90% relative humidity. Furthermore, Calcium Mirror Tests were used in a setup described by Hergert et al. [S. Hergert, M. Linkor, M. Korny, N. Fruehauf, *Process development and accurate low-cost characterization for OLED sealants by using a calcium test, J. Soc. Inf. Display,* 15 No. 6 (2007) 421-429] to determine WVTR below $10^{-3}$ g/(m²/day) at both 23° C./50% RH and 38° C./90% RH on at least nine different spots of each sample with a 3 mm measurement spot diameter.

(xvi) The oxygen transmission rate (in mL/m²/day) of the composite film may be measured using ASTM D3985 using a MOCON OX-TRAN 2/20 device.

The invention is further illustrated by the following examples. The examples are not intended to limit the invention as described above. Modification of detail may be made without departing from the scope of the invention.

EXAMPLES

Example 1

A polymer composition comprising unfilled PET was co-extruded with an EMAA copolymer (Nucrel®0411HS; having an MFI of about 11 according to ASTM D1238 using a temperature of 190° C. and a mass of 2.16 kg), cast onto a cooled rotating drum, pre-heated to a temperature of 80 to 81° C. and stretched in the direction of extrusion to approximately 3.4 times its original dimensions. The film was heated to a temperature of about 95° C., passed into a stenter oven at a temperature of 110° C. where the film was stretched in the sideways direction to approximately 3.6 times its original dimensions. The biaxially-stretched film was heat-set by successive heating in three zones of defined temperature (225, 225 and 190° C.) by conventional means at a film-web speed of 10.8 m/min; the approximate residence time in each of the three zones was 40 seconds. In the resulting composite film, the thickness of the PET layer (the polymeric base layer) was about 100 μm, and the thickness of the EMAA layer (the polymeric protective layer) was about 15 μm. A sample of the resulting composite film was tested as described herein. The peel-force of the polymeric protective layer from the PET base layer was about 0.64 N/cm. After peeling, the PET base layer exhibited a TLT of about 87%, a haze of 1.09% and an Ra of 4.01 nm.

The composite film was further processed by removing the polymeric protective layer, and depositing a permeation barrier layer of zinc tin oxide (ZTO) on the exposed first surface of the PET base layer by means of a dual-magnetron reactive sputtering method in a roll-to-roll configuration. Thus, a target of a zinc tin alloy (52 wt % zinc) was sputtered in the presence of the inert gas argon and the reactive gas oxygen, at a pressure in the range of 0.3 to 0.8 Pa and a dynamic deposition rate of 64 nm/min. The degree of coverage of the target with reaction products and thus the deposition rate, layer thickness and the layer composition of the zinc tin oxide was adjusted via the supply of the reactive gas oxygen using a control loop as taught in US-2010/0136331-A. The final thickness of the permeation barrier layer was 100 nm.

The polymeric protective layer previously removed from the polymeric base layer was then brought into contact with the exposed surface of the deposited ZTO barrier layer. The same surface of the polymeric protective layer which was in contact with the PET base layer was contacted with the ZTO barrier layer. All three steps (removing the polymeric protective layer; ZTO deposition; and disposal of the polymeric protective layer onto the ZTO surface) were done in a single winding step within a roll-to-roll vacuum coating machine on a substrate width of 400 mm.

A sample of the resulting multi-layer assembly was tested as described herein. The peel-force between the polymeric protective layer and the ZTO layer was measured to be greater than 6 N/cm.

The WVTR of the multi-layer film comprising polymeric base layer, functional layer, and the polymeric protective layers, measured as described herein, was less than 0.001 g/m²/day at 38° C./90% RH.

The invention claimed is:

1. A method of preparing a multi-layer assembly, or of protecting a surface of a multi-layer substrate from damage and/or contamination and/or debris, said method comprising the steps of:
   (i) providing a composite film comprising a polymeric base layer having a first and second surface and disposed on the first surface thereof a first polymeric protective layer having a first surface and a second surface such that the first surface of the said polymeric base layer is in contact with the first surface of the first polymeric protective layer, wherein said first polymeric protective layer comprises a first ethylene-based copolymer;
   (ii) removing said first polymeric protective layer from the first surface of said polymeric base layer;
   (iii) disposing on the exposed first surface of said polymeric base layer one or more functional layers to provide a multi-layer substrate, wherein the, or at least the uppermost, functional layer comprises zinc and/or tin in an amount of from about 5 wt % to about 80 wt % of said functional layer; and
   (iv) disposing either said first polymeric protective layer comprising said first ethylene-based copolymer or a second polymeric protective layer comprising a second ethylene-based copolymer onto an exposed surface of the, or at least the uppermost, functional layer comprising zinc and/or tin to provide a multi-layer assembly;
   wherein the second polymeric protective layer comprising the second ethylene-based copolymer has previously been removed from an analogous composite film in a manner analogous to that defined in step (ii).

2. A method according to claim 1 wherein said multi-layer assembly is a permeation barrier film, encapsulation film, OLED stack or electronic device.

3. A method according to claim 1 wherein said multi-layer assembly is a permeation barrier film, and wherein said permeation barrier film is suitable as packaging or as a substrate for an electronic device.

4. A method according to claim 1 wherein said multi-layer assembly is an encapsulation film, and wherein said encapsulation film is an encapsulation film suitable for use in an electronic device.

5. A method according to claim 1 wherein step (iv) comprises disposing the first polymeric protective layer comprising the first ethylene-based copolymer onto the exposed surface of the, or at least the uppermost, functional layer comprising zinc and/or tin.

6. A method according to claim 1 wherein step (iv) comprises disposing the second polymeric protective layer comprising the second ethylene-based copolymer onto the exposed surface of the, or at least the uppermost, functional layer comprising zinc and/or tin.

7. A method according to claim 1 wherein said first polymeric protective layer or said second polymeric protective layer is disposed onto the exposed surface of the, or the uppermost, functional layer comprising zinc and/or tin such that the first surface of said first polymeric protective layer or said second polymeric protective layer contacts the exposed surface of the, or the uppermost, functional layer.

8. A method according to claim 1 wherein said first polymeric protective layer or said second polymeric protective layer is brought into contact with the exposed surface of the, or the uppermost, functional layer comprising zinc and/or tin in the absence of any additional adhesive between the first surface of the first polymeric protective layer or the second polymeric protective layer and the exposed surface of the, or the uppermost, functional layer.

9. A method according to claim 1 wherein an adhesive bond strength between the first polymeric protective layer or the second polymeric protective layer and the, or the uppermost, functional layer comprising zinc and/or tin is such that the peel force is at least 1.5 N/cm, and/or wherein an adhesive bond strength ($S_{P-F}$) between the first polymeric protective layer or the second polymeric protective layer and said functional layer comprising zinc and/or tin is greater than an adhesive bond strength ($S_{P-B}$) between the first polymeric protective layer or the second polymeric protective layer and the polymeric base layer such that $S_{P-F} \geq 2S_{P-B}$.

10. A method according to claim 1 wherein said polymeric base layer comprises a polyester selected from linear, thermoplastic, and crystallisable polyesters.

11. A method according to claim 1 wherein said polymeric base layer comprises a polyester derived from: (i) one or more diol(s); (ii) one or more aromatic dicarboxylic acid(s); and (iii) optionally, one or more aliphatic dicarboxylic acid(s) of formula $C_nH_{2n}(COOH)_2$ wherein n is 2 to 8, wherein said aromatic dicarboxylic acid(s) is/are present in the polyester in an amount of from 80 to 100 mole % based on the total amount of dicarboxylic acid components in the polyester.

12. A method according to claim 1 wherein said polymeric base layer comprises a polyester selected from polyethylene terephthalate and polyethylene naphthalate.

13. A method according to claim 1 wherein said polymeric base layer has a haze of no more than 15% and/or a total luminous transmission (TLT) for light in the visible region (400 nm to 700 nm) of at least 80%.

14. A method according to claim 1 wherein said polymeric base layer exhibits a shrinkage of no more than 1.5% at 150° C. over 30 minutes.

15. A method according to claim 1 wherein the first surface of said polymeric base layer exhibits an Ra of less than 10 nm.

16. A method according to claim 1 wherein the thickness of said polymeric base layer is in the range of from about 5 µm to about 500 µm, and/or the thickness of the first polymeric protective layer or the second polymeric protective layer is in the range of from about 1.0 µm to about 200 µm, and/or the thickness of the or each functional layer is in the range of from about 5 nm to about 30 µm.

17. A method according to claim 1 wherein the first ethylene-based copolymer of the first polymeric protective layer or the second ethylene-based copolymer of the second polymeric protective layer is selected from ethylene-methacrylic acid (EMAA) copolymers and ethylene-acrylic acid (EAA) copolymers.

18. A method according to claim 1 wherein the first ethylene-based copolymer or the second ethylene-based copolymer is selected from ethylene-methacrylic acid (EMAA) copolymers and the methacrylic acid is present in the EMAA copolymer in the range of from about 2 wt % to about 15 wt % of the copolymer.

19. A method according to claim 1 wherein the first ethylene-based copolymer or the second ethylene-based copolymer is selected from ethylene-methacrylic acid (EMAA) copolymers and the EMAA copolymer is an ionomer comprising a minor proportion of metal salt-containing units of methacrylic acid.

20. A method according to claim 19 wherein the metal is selected from alkali metals, magnesium and zinc.

21. A method according to claim 1 wherein the first ethylene-based copolymer or the second ethylene-based copolymer is selected from ethylene-methacrylic acid (EMAA) copolymers and the EMAA copolymer is an ionomer selected from copolymers of ethylene and methacrylic acid partially or completely neutralised with metal cation(s).

22. A method according to claim 1 wherein the first ethylene-based copolymer or the second ethylene-based copolymer is selected from ethylene-acrylic acid (EAA) copolymers and the acrylic acid is present in the EAA copolymer in the range of from about 5 wt % to about 20 wt % of the copolymer.

23. A method according to claim 1 wherein the first polymeric protective layer is a blend of said first ethylene-based copolymer and one or more polyolefin(s) and/or the second polymeric protective layer is a blend of said second ethylene-based copolymer and one or more polyolefin(s).

24. A method according to claim 1 wherein said one or more functional layers are selected from permeation barrier layers, electrically conductive layers, thermally conductive layers, optical adjustment layers, semiconductor layers and photoactive layers.

25. A method according to claim 1 wherein the thickness of the or each functional layer is in the range of from about 1 nm to about 30 µm.

26. A method according to claim 1 wherein said functional layer or at least said uppermost functional layer is a layer wherein said zinc and/or tin is present in an amount of from about 5 wt % to about 70 wt %, of said functional layer.

27. A method according to claim 1 wherein said functional layer or at least said uppermost functional layer has a thickness in the range of from about 1 nm to about 1000 nm.

28. A method according to claim 1 wherein said functional layer or at least one of said functional layers is a permeation barrier layer.

29. A method according to claim 1 wherein said functional layer or at least said uppermost functional layer is disposed by a vacuum deposition process.

30. A method according to claim 1 wherein the preparation of said multi-layer assembly is a roll-to-roll process comprising a plurality of rollers, wherein contact between the surface of the rollers and the exposed first surface of the polymeric base layer is avoided, and/or wherein contact between the surface of the rollers and the exposed surface of the, or the uppermost, functional layer is avoided.

31. A method according to claim 1 wherein the multi-layer assembly comprises a single polymeric protective layer or comprises multiple polymeric protective layers separated from each other by the one or more functional layer(s).

32. A method according to claim 1 wherein the multi-layer assembly is optically clear.

33. A method according to claim 1 wherein said polymeric base layer comprises a UV-stabiliser and/or hydrolysis stabiliser and/or anti-oxidant.

34. A method according to claim 1 wherein the polymeric base layer comprises a polyester derived from one or more diol(s) and one or more dicarboxylic acid(s).

35. A method according to claim 1 wherein both zinc and tin are present in said functional layer or at least one of said functional layers.

36. A method according to claim 1, wherein the first ethylene-based copolymer is the same as the second ethylene-based copolymer.

37. A method of manufacture of an electronic device, said method comprising the steps of:
(i) providing a composite film comprising a polymeric base layer having a first and second surface and disposed on the first surface thereof a first polymeric protective layer having a first surface and a second surface such that the first surface of said polymeric base layer is in contact with the first surface of the first polymeric protective layer, wherein said first polymeric protective layer comprises a first ethylene-based copolymer;

(ii) removing said first polymeric protective layer from the first surface of said polymeric base layer;

(iii) disposing on the exposed first surface of said polymeric base layer one or more functional layers to provide a multi-layer substrate, wherein the, or at least the uppermost, functional layer comprises zinc and/or tin in an amount of from about 5 wt % to about 80 wt % of said functional layer;

(iv) disposing either said first polymeric protective layer comprising said first ethylene-based copolymer or a second polymeric protective layer comprising a second ethylene-based copolymer onto an exposed surface of the, or at least the uppermost, functional layer comprising zinc and/or tin to provide a multi-layer assembly; and (v) providing one or more conductive layer(s) and/or semiconductor layer(s) within or on said multi-layer assembly;

wherein the second polymeric protective layer comprising the second ethylene-based copolymer has previously been removed from an analogous composite film in a manner analogous to that defined in step (ii).

38. A method according to claim 37 wherein said one or more conductive layer(s) and or semiconductor layer(s) is optically clear.

39. A method according to claim 37 wherein said one or more conductive layer(s) are provided within or on said multi-layer assembly, and said one or more conductive layer(s) comprise at least one of Au, Ag, In, Al, Sn and Zn, or comprise a conductive organic conjugated polymer.

40. A method according to claim 37 wherein said electronic device is selected from electroluminescent (EL) display devices, electrophoretic display devices, photovoltaic cells and semiconductor devices, and/or wherein said electronic device is a flexible electronic device.

41. A method according to claim 37 wherein said composite film is a biaxially oriented composite film and/or is a coextruded composite film.

42. A method according to claim 37 wherein an adhesive bond strength of the first polymeric protective layer to said polymeric base layer is such that the peel force is no more than 2.5 N/cm.

43. A method of claim 37 wherein step (v) comprises disposing said one or more conductive layer(s) and/or semiconductor layer(s) onto a surface of the first polymeric protective layer or the second polymeric protective layer of said multi-layer assembly.

44. A method according to claim 37, wherein the first ethylene-based copolymer is the same as the second ethylene-based copolymer.

45. A multi-layer assembly comprising:

(i) a polymeric base layer having a first and second surface;

(ii) one or more functional layers disposed on the first surface of said polymeric base layer, wherein the, or at least the uppermost, functional layer comprises zinc and/or tin in an amount of from about 5 wt % to about 80 wt % of said functional layer; and (iii) a polymeric protective layer comprising an ethylene-based copolymer disposed onto the surface of the, or at least the uppermost, functional layer comprising zinc and/or tin.

46. A multi-layer assembly according to claim 45 wherein said polymeric protective layer has a first surface and a second surface, and is derived from a composite film comprising a polymeric base layer having a first and second surface and having said polymeric protective layer disposed on the first surface thereof such that the first surface of said polymeric base layer is in contact with the first surface of said polymeric protective layer, wherein the polymeric protective layer is removed from the first surface of said polymeric base layer of said composite film prior to disposing the polymeric protective layer onto the surface of the, or at least the uppermost, functional layer comprising zinc and/or tin.

47. A multi-layer assembly according to claim 46 wherein said composite film is a biaxially oriented composite film and/or a coextruded composite film.

48. A multi-layer assembly according to claim 46 wherein the polymeric base layer of the composite film from which the polymeric protective layer is removed is the polymeric base layer of the multi-layer assembly.

49. A multi-layer assembly according to claim 45 wherein said polymeric protective layer has a first and second surface wherein the polymeric protective layer is disposed onto an exposed surface of the, or the uppermost, functional layer comprising zinc and/or tin such that the second surface of said polymeric protective layer contacts the exposed surface of the, or the uppermost, functional layer.

50. A multi-layer assembly according to claim 45 wherein said polymeric protective layer has a first and second surface and wherein said polymeric protective layer is disposed onto an exposed surface of the, or the uppermost, functional layer comprising zinc and/or tin in the absence of any additional adhesive between the first surface of the polymeric protective layer and the exposed surface of the, or the uppermost, functional layer.

51. A multi-layer assembly according to claim 45 wherein an adhesive bond strength between the polymeric protective layer and the, or uppermost, functional layer is such that the peel force is at least 1.5 N/cm, and/or wherein an adhesive bond strength ($S_{P-F}$) between the polymeric protective layer and said functional layer is greater than an adhesive bond strength ($S_{P-B}$) between the polymeric protective layer and the polymeric base layer such that $S_{P-F} \geq 2S_{P-B}$.

52. An electronic device comprising a multi-layer assembly comprising:

(i) a polymeric base layer having a first and second surface;

(ii) one or more functional layers disposed on the first surface of said polymeric base layer, wherein the, or at least the uppermost, functional layer comprises zinc and/or tin in an amount of from about 5 wt % to about 80 wt % of said functional layer; and (iii) a polymeric protective layer comprising an ethylene-based copolymer disposed onto the surface of the, or at least the uppermost, functional layer comprising zinc and/or tin;

and wherein said electronic device further comprises:

(iv) one or more conductive layer(s) and/or semiconductor layer(s) within or on said multi-layer assembly.

53. An electronic device according to claim 52 wherein said one or more conductive layer(s) and or semiconductor layer(s) are optically clear.

54. An electronic device according to claim 52 wherein said electronic device is selected from electroluminescent (EL) display devices, electrophoretic display devices, photovoltaic cells and semiconductor devices and/or wherein said electronic device is a flexible electronic device.

55. An electronic device according to claim 52 comprising the multi-layer assembly and an encapsulant layer, wherein the multi-layer assembly has an outer layer and the outer layer of said multi-layer assembly is the polymeric protective layer which is in direct contact with said encapsulant layer without an intervening adhesive layer.

56. An electronic device according to claim 55 wherein said encapsulant layer is selected from ethylene vinyl acetate (EVA) copolymer resins, polyvinylbutyral resins, silicone resins and ionomer resins.

57. An electronic device of claim 52 wherein said one or more conductive layer(s) and/or semiconductor layer(s) is disposed on the surface of the polymeric protective layer of said multi-layer assembly.

\* \* \* \* \*